US011538131B2

(12) United States Patent
Reed et al.

(10) Patent No.: US 11,538,131 B2
(45) Date of Patent: Dec. 27, 2022

(54) SYSTEMS AND METHODS FOR THE APPLICATION OF ADAPTIVE VIDEO WATERMARKS

(71) Applicant: INSCAPE DATA, INC., Irvine, CA (US)

(72) Inventors: Brian Reed, Darien, CT (US); W. Leo Hoarty, Morgan Hill, CA (US)

(73) Assignee: INSCAPE DATA, INC., Irvine, CA (US)

( * ) Notice: Subject to any disclaimer, the term of this patent is extended or adjusted under 35 U.S.C. 154(b) by 0 days.

(21) Appl. No.: 17/389,147

(22) Filed: Jul. 29, 2021

(65) Prior Publication Data

US 2022/0036495 A1 Feb. 3, 2022

Related U.S. Application Data

(60) Provisional application No. 63/059,766, filed on Jul. 31, 2020.

(51) Int. Cl.
*G06T 1/00* (2006.01)
(52) U.S. Cl.
CPC .................. *G06T 1/0028* (2013.01)
(58) Field of Classification Search
CPC .......... G06T 1/0028; G06T 2201/0051; H04N 21/8358; H04N 19/467
See application file for complete search history.

(56) References Cited

U.S. PATENT DOCUMENTS

| | | | |
|---|---|---|---|
| 2004/0234098 A1* | 11/2004 | Reed | G06T 1/0042 |
| | | | 382/100 |
| 2014/0037129 A1 | 2/2014 | Reed et al. | |
| 2019/0261012 A1* | 8/2019 | Hoarty | H04N 19/467 |
| 2019/0295208 A1* | 9/2019 | Hoarty | G09G 5/393 |

FOREIGN PATENT DOCUMENTS

WO 2022/026855 A1 2/2022

OTHER PUBLICATIONS

International Search Report and Written Opinion for PCT Application No. PCT/US2021/043944 dated Oct. 29, 2021; 10 pages.

\* cited by examiner

*Primary Examiner* — Christopher Wait
(74) *Attorney, Agent, or Firm* — Polsinelli LLP

(57) ABSTRACT

Systems and methods are provided for decoding watermarks in video frames. A media device may receive a video frame that includes a first predetermined region comprising a watermark and a second predetermined region having pixel values selected to reduce the perceptibility of the first predetermined region. The media device may detect the watermark in the first predetermined region of the video frame and identify one or more contiguous subsets of pixels that correspond to a first pixel value and one or more contiguous subsets of pixels that correspond to a second pixel value. The media device then assigns a first symbol to the one or more contiguous subsets of pixels that correspond to the first pixel value and second symbol the one or more contiguous subsets of pixels that correspond to the second pixel value. The media device then generates a first sequence of symbols from the assigned symbols.

20 Claims, 19 Drawing Sheets

Border treatment to assist in blending watermark with underlying video darkened pixel rows below watermark to blend better with video below.

Enhanced Lead-In Symbols—Extended Number of Pixels per Symbol

(1) At start of each frame, the pixel count is doubled per symbol for the first 'n' symbols.

The mathematical relationship between RGB and HSL color space:

$L = R+G+B / 3$ $S = 1 - (3 / (R+G+B)) * \min(R,G,B)$ $H = \cos^{-1}((0.5(R-G)+(R-B)) / ((((R-G)2)+((R-B)(G-B)))^{0.5})$

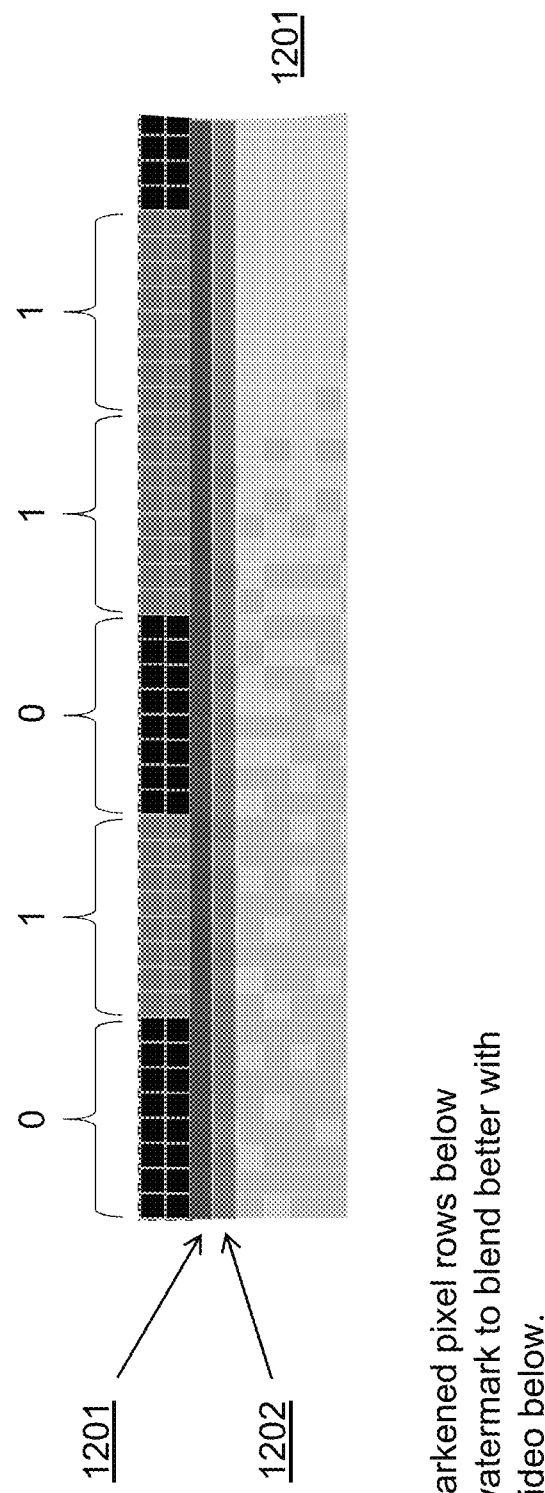

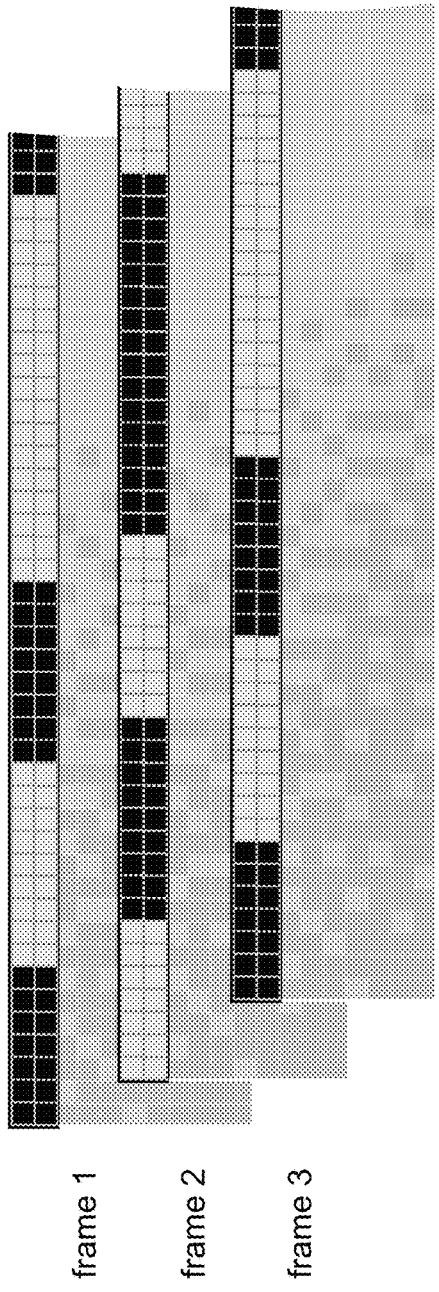
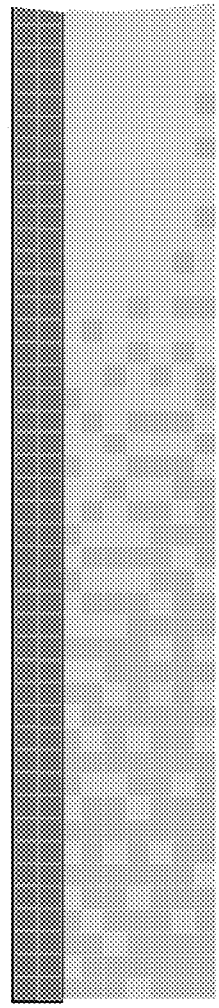
Alternating value of symbols, frame by frame
frame 1
frame 2
frame 3
Alternating video frame symbol values tends to cause merging of values as perceived by a TV viewer, reducing the effect of flicker from the embedded data.
FIG. 13A

SYSTEMS AND METHODS FOR THE APPLICATION OF ADAPTIVE VIDEO WATERMARKS

CROSS REFERENCE TO RELATED APPLICATIONS FILED

This application claims the benefit to U.S. Provisional Patent Application No. 63/059,766 filed on Jul. 31, 2020, which is hereby incorporated by reference in its entirety for all purposes.

TECHNICAL FIELD

This disclosure generally relates to embedding data into a video signal; and more specifically to embedding data into a video signal without visually impairing the video signal.

BACKGROUND

Digital watermarking describes a technique for hiding certain data, such as identification data regarding the provenance of a digital media stream. Digital watermarks can be embedded in an image file or video frames in a way that inhibited their removal without also damaging the underlying content. When such watermarked digital content is distributed online or in recorded media, the data reflecting its origination travels with it, which enables the originator to claim the source of the content.

In cathode ray tube (CRT) televisions watermarks can be embedded into the vertical blanking interval between frames. In CRT televisions the displayed image is transmitted in rows of lines in which black to white (and later color) is displayed as it was projected onto the phosphors coating the inside of the CRT. These lines are repeated as interlaced frames where the frames are separated by a few dozen lines, which were not displayed. These non-displayed lines are referred to the "vertical blanking interval" (VBI). The VBI is used to allow the CRT to move its beam from the bottom back to the top and settle down before beginning the scan of another video frame. Information can be embedded into the portion of the video signal that corresponds to the VBI. For example, data for closed captioning for the hearing impaired or train schedules for videotext displays (particularly popular in Europe and Asia) are embedded into the VBI portion of the video signal.

Digital televisions do not operate with cathode ray tubes, and as such, do not require a VBI between video frames to operate. Modern digital television standards no longer implement data over VBI foreclosing VBI as a mechanism to embed data. Modern digital televisions standards instead use a separate data stream that is interwoven with audio and video data. While this enables a video signals to include additional data, the data is inaccessible to media devices preventing the application of watermarks.

Therefore, there is a need for alternative approaches for inserting additional information into video signals.

SUMMARY

Methods are described herein for embedding data into a video frame with a reduced likelihood of being perceived by users. receiving a video frame, wherein a first predetermined region of the video frame includes a first set of pixels and a second predetermined region of the video frame includes a second set of pixels, the second set of pixels having pixel values that are based on pixel values of pixels of a third predetermined region of the video frame; detecting a watermark in the first predetermined region of the video frame; identifying, within the first set of pixels, one or more contiguous subsets of pixels that correspond to a first pixel value and one or more contiguous subsets of pixels that correspond to a second pixel value; assigning a first symbol to the one or more contiguous subsets of pixels that correspond to a first pixel value and second symbol to the one or more contiguous subsets of pixels that correspond to a second pixel value; and generating, based on the first pixel value and the second pixel value, a first sequence of symbols.

Systems are described herein for embedding data into a video frame with a reduced likelihood of being perceived by users. The systems include one or more processors and a non-transitory computer-readable medium storing instructions that, when executed by the one or more processors, cause the one or more processors to perform any of the methods as previously described.

Non-transitory computer-readable media are described herein that store instructions which, when executed by one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Illustrative embodiments of the present application, including its systems and methods, are summarized below in the following drawing figures:

FIG. 12 illustrates an example video frame in which a transition region proximate to the watermark are darkened progressively to increase perceptual blurring of the watermark to the human eye according to aspects of the present disclosure FIG. 13A illustrates an example sequence of video frames in which the values for zero and one symbols of a watermark alternate to cause a perceptual blurring of the watermark to the human eye according to aspects of the present disclosure.

DETAILED DESCRIPTION

Figure 1:
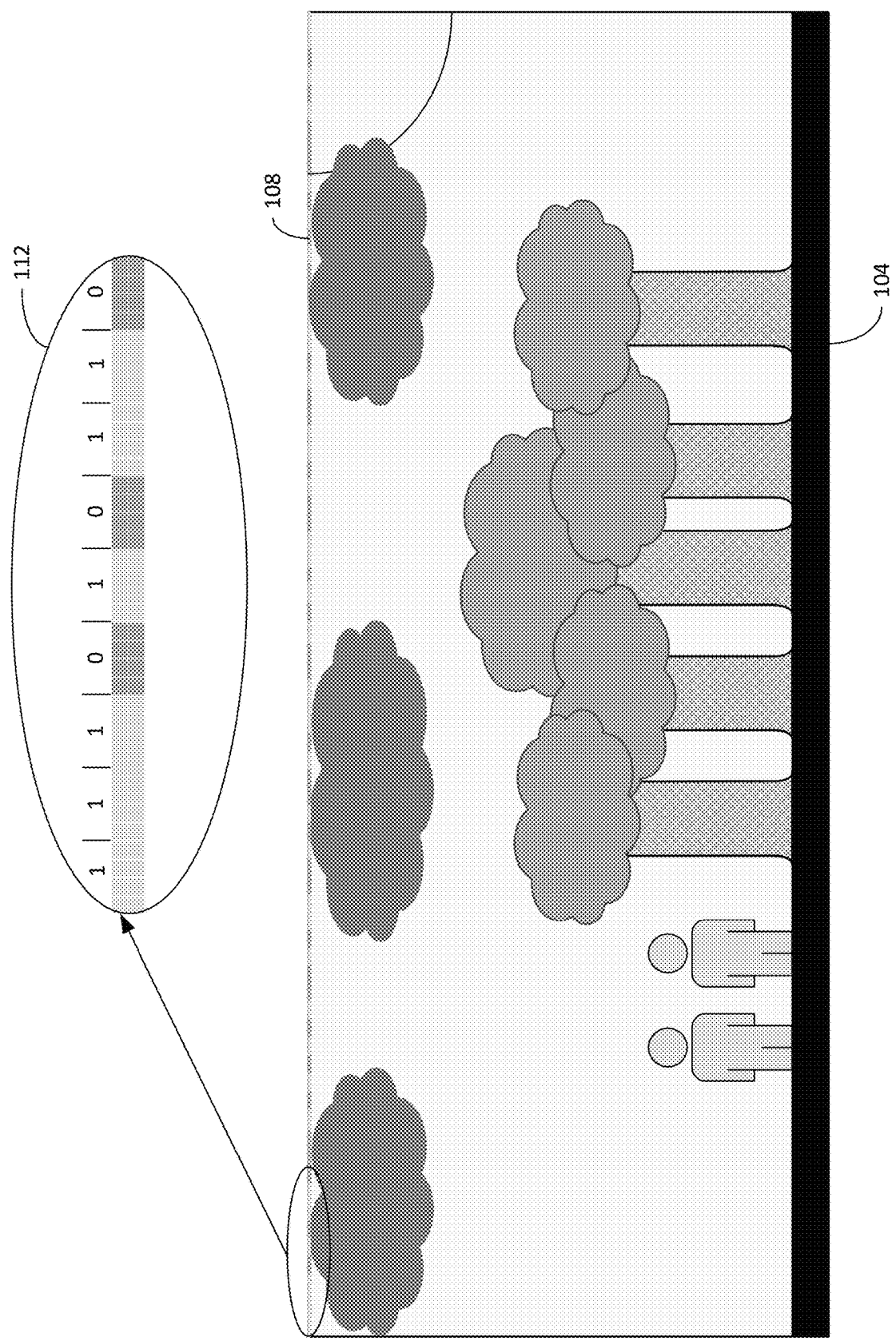
FIG. 1 illustrates an example of data embedded in the top rows of a video frame using a two-level watermark according to aspects of the present disclosure.

The present disclosure includes systems and methods for generating, embedding, and/or decoding digital data code (e.g., watermarks) into a digital image that is imperceptible to the human eye. Watermarks may be embedded into images or video frames to provide data and/or executable code to media devices, such as smart televisions, set-top boxes, mobile devices, laptop computers, tablet computers, desktop computers, etc. The watermarks can be embedded into video frames by modulating a pixel values of the top one or two rows of pixels. For example, white pixels may correspond to a first symbol of a binary code and black pixels may correspond to a second symbol of the binary code. The media device may detect and extract the symbols from the watermark. A processing component of the media device may process the symbols to decode the data and/or executable code of the watermark.

The decoded symbols may provide additional information associated with the displayed video and/or cause the media device to perform certain functions. The additional information may include, but is not limited to, information associated with the content of the displayed video (e.g., such as actors, characters, settings, teams, production staff, production characteristics, or any other fact or characteristics of the content, metadata associated with displayed video (e.g., resolution, pixel values, broadcast origin, etc.), communications associated with the displayed video, etc. The decoded symbols of the watermark may include a trigger signal at the start of a video or a portion thereof (e.g., such as a commercial etc) to allow a media device to detect the trigger signal and substitute a video segment (e g., such as an advertisement, commercial, other video segment, or the like) stored locally in the set-top or smart TV's memory or display video information from a remote server. The decoded symbols may correspond to instructions that may be executed by processing components of the media device to perform operations such as replacing video frames, or portions thereof, with video frames stored locally, video frames decoded in the watermark, or video frames streamed from a remote server.

In some instances, modulating pixel values of portions of the video frame may cause the watermark to be perceptible to the human eye. For instance, if the modulation of the pixel values produces pixels with a strong contrast to the pixels in the non-watermark portion of the video frame, the watermark may be perceptible to the human eye. The watermark may be perceptible even when the watermark takes up a small portion of the video frame and/or is positioned in the fringe of the video frame. A perceptible watermark may appear as a visual artifact that may cause a user to think there is an error in the media device or video or distract the user from the non-watermark portion of the video frame.

The watermark may be modified using one or more processes to reduce the perceptibility of the watermark within video frame. It should be noted, that each of the following watermark modification processes may be provided alone or in combination with other watermark modification processes. A first watermark modification process can take advantage of the human visual perception not being sensitive to minor changes in pixel color. This modification process may adjust one or more color-difference components (e.g., chrominance-blue (Cb) difference signal and/or chrominance-red (Cr) difference signal) of the pixels of the watermark. The color-difference components may be adjusted based on the color difference components of pixels adjacent to the watermark (e.g., such as one or more rows of pixels adjacent to the watermark). An average hue of the nearby portion of the video frame may be determined. The watermark may be defined by shifting the average hue a first predetermined amount to represent a first symbol and shifting the average hue a second predetermined amount to represent the second symbol. Since the watermark pixels have a hue that differs from the nearby portion of the video frame by only the first and second predetermined amounts, the human eye is less likely to notice the watermark.

A second watermark modulation process can include adjusting the luminance component (Y) pixels of the watermark. The luminance component can be represented between 0 (for black) and 100 (for white). The watermark may be defined by modulating the luminance component of the pixels that are to represent the first symbol and the pixels that are to represent the second symbol of the watermark. To reduce the likelihood that the watermark will be perceptible, the luminance variation between the first symbol and the second symbol may be less than 100. In one illustrative example, the first symbol may be represented by pixels having a luminance of 10 and the second symbol may be presented by pixels having a luminance of 50. One of ordinary skill will appreciate that other luminance values can be used. In some cases, the second watermark modulation process may be combined with the first watermark modulation process by varying both the color-difference components and the luminance components. For instance, combining the first and second modulation processes may be performed to increase a quantity of symbols that can be embedded into a video frame (e.g., from binary code to a base-four code) and/or to further reduce the likelihood that a user will perceive the watermark.

The smaller the difference between the first symbol and the second symbol (e.g., 10 to 50 in the previous example), the greater the likelihood that noise in the video signal may cause errors (e.g., preventing detection of the watermark or altering the decoded watermark). An error correction watermark may be inserted in the first video frame that is to include the watermark or the $n^{th}$ video frame to prevent noise from rendering the watermark unreadable. The error correction watermark includes the same encoding as the previous watermark but has a larger variation in luminance. Returning to the previous example of a minimally varying luminance between 10 and 50, the error correction watermark may include a variation in luminance between 10 and 80. The error correction watermark may be inserted any number of times and in any video frame of a set of video frames that is to include the watermark.

A third watermark modulation process includes defining a first and second watermark with the second watermark being a reverse of the first watermark. The first watermark may include a first pixel value corresponding to the first symbol and a second pixel value corresponding to the second symbol. The second watermark with the same sequence of symbols, but with first pixel value corresponding to the second symbol and the second pixel value corresponding to the first symbol. For example, the first watermark may include a first set of pixels corresponding to the first pixel value, a second set of pixels corresponding to the second pixel value, and a third set of pixels corresponding to the first pixel value. The symbol sequence of the first watermark may be first symbol, second symbol, first symbol (e.g., 010 in a binary translation). The second watermark may include a first set of pixels corresponding to the second pixel value, a second set of pixels corresponding to the first pixel value, and a third set of pixels corresponding to the second pixel value. Since the second watermark is intended to be the inverse of the first watermark, the media device decodes the second watermark to the same as the first watermark or first symbol, second symbol, first symbol. The second watermark may be configured to be included a video frame that immediately follows the video frame that includes the first watermark. The media device may be configured to expect store the watermark of two adjacent video frames at a time.

Reversing a watermark that is included in a first video frame in a subsequent frame causes watermark to be perceived as a solid color (e.g., the average of the pixel value representing the first symbol and pixel value representing the second symbol). This reduces the display of pixels near other pixels with contrasting chrominance and/or luminance (e.g., black pixel next to a white pixel, etc.). As a result, the watermark may be less perceptible to the user of the media device.

A fourth watermark modulation process includes modifying a set of pixels adjacent to the watermark according to the pixel values of the watermark. If the watermark is positioned in the top one or two rows of the video frame, then the set of pixels adjacent to the watermark may be the next one or more rows after the video frame (e.g., the second, third, etc. rows from the top of the video frame). The set of pixels may be referred to as a border between the watermark and the remaining pixels of the video frame. In some instances, each row of the border may be of a same pixel value. In other instances, the rows may be a gradient from the row closest to the watermark having a pixel value based on the first pixel value and the second pixel value of the watermark and the row closest to the remaining portion of the video frame having a pixel value based on adjacent pixels of the video frame. The gradient may soften difference in pixel values between the video frame and the watermark to reduce the perceptibility of the watermark. It should be noted that the pixels of a row of the border may a same pixel value, a similar pixel value (e.g., allowing for slight variations for reduced perceptibility), or each pixel value may have a value that is based on the position of the pixel along the gradient (e.g., the row of the boarder if more than one) and the pixel values of nearby pixels in the video frame.

In one example, use of the systems and methods described herein includes embedding a code into a video to be used as a signal to a media device, such as a smart TV or set-top box. The code may cause the client television receiver to substitute a different video segment (e.g., one or more video frames) for the video segment currently being displayed when the data code is received by the client television device. This process may be referred to "dynamic insertion" and when an advertisement is involved "dynamic ad insertion". The dynamic replacement of a video segment with another video segment may occur in real time. For instance, any time one or more frames that are eligible to be replaced are detected (e.g., based on detecting a watermark in the one or more frames), the client device receiver can replace the one or more frames with one or more other frames In another example use of the systems and methods described herein a watermark may be used to trigger an on-screen pop-up window providing additional information associated with a displayed video frame. For example, if the displayed video frame includes a product, the pop-up window may include information associated with the product. If the displayed video frame corresponds to a movie or a television program, the pop-up window may include information associated with the actors in the video frame or in the movie or television program, the production staff of the television program such as the director, etc., information associated with related movies or programs, and/or any information associated with the movie or television program.

The pop-up window can include a uniform resource locator (URL) link to a website that includes the additional information and/or provides the user an ability to purchase the product being displayed. The media device may include a web-browser that can access the website and facilitate the purchase. Alternatively, or additionally, the pop-up window can include a quick response (QR) code that a user can capture with a mobile device. Capturing the QR code can cause the mobile device to open a web-browser and load a URL link in the QR code.

FIG. 1 illustrates an example of data embedded in the top rows of a video frame using a two-level watermark according to aspects of the present disclosure. Frame 104 represents a video frame that may be presented via media device. Watermark 108 may be inserted by modulating pixel values of a set of pixels of frame 104. The set of pixels may be positioned in a fringe of frame 104 such as the top one or more rows of pixels (as shown), the bottom one or more rows of pixels, right two columns of pixels, left two columns of pixels, etc. In some instances, watermark 108 may be split between two disparate locations of frame 108. For instance, watermark 108 may be located at both the top row and the bottom row, top row and left column, etc.

As shown, watermark 108 may include pixels of a first pixel value representing a first symbol of a binary code (e.g., 0) and pixels of a second pixel value representing a second symbol of the binary code (e.g., 1). Watermark 108 may include additional pixel values representing additional symbols of a non-binary code. Watermark 108 be represented by discrete sets of pixels that represent a symbol of the binary code. If the source is lossless (e.g., the signal data is not subject to distortion or loss due to noise or other signal impedances), then a single pixel may represent a single symbol. If the video source may be subject to loss (e.g., such as broadcast television, cable television, etc. where portions of the frame may be distorted due to noise, distance, etc.), then a set of pixels may represent a single symbol. As shown, eight pixels may be used represent each symbol (e.g., two rows of four pixels). In some instances, a particular video frame, such as a first video frame containing watermark 108, each set of pixels may include additional pixels (e.g., such as two rows of eight pixels, or the like), to ensure that the media device detects watermark 108.

The expanded portion 112 of watermark 108 illustrates the symbols represented in each set of pixels. In the example shown, sets of pixels having a higher luminance (e.g., closer to white) are assigned a value of 1 and sets of pixels having a lower luminance (e.g., closer to black) are assigned a value of zero. The luminance may be varied from between 0 (e.g., black) and 100 (e.g., white). In some instances, to reduce the perceptibility of watermark, the difference in lance between pixels representing 0 and pixels representing 1 may be minimized. For instance, the pixels representing 1 may have luminance of 50 and the pixels representing 0 may have a luminance of 10. The color component of the sets of pixels of the watermark 108 may be selected based on the color component of nearby pixels (e.g., adjacent portion of frame 104, or the like). The color component may be used for larger-base codes (e.g., codes with greater than 2 symbols) and/or to further reduce the perceptibility of watermark 108 by a user of the media device.

Figure 2:
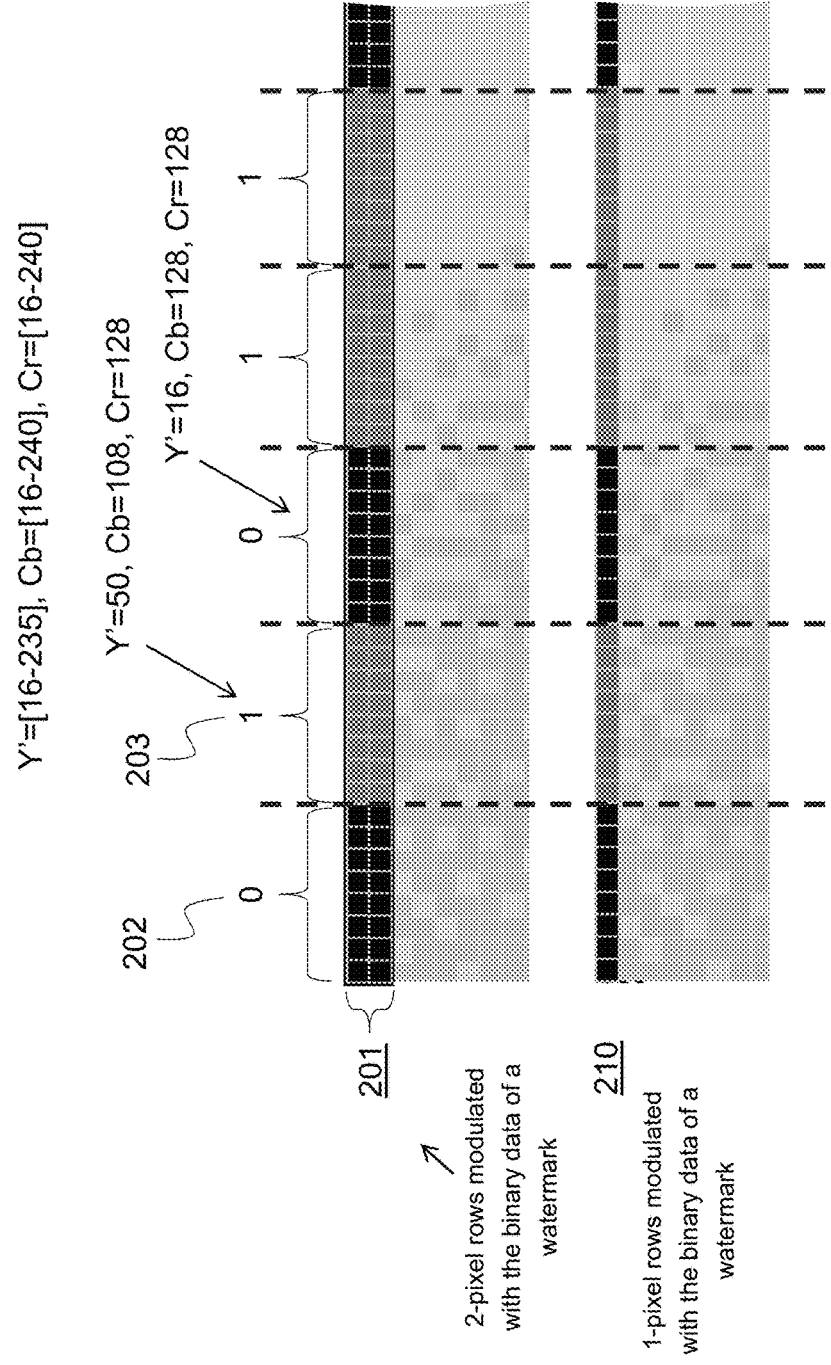
FIG. 2 illustrates example binary watermarks embedded into the top row and top two rows of a video frame according to aspects of the present disclosure.

FIG. 2 illustrates example binary-coded watermarks embedded into the top row and top two rows of a video frame according to aspects of the present disclosure. Watermark 201 illustrates a watermark comprising two rows of pixels representing a sequence of symbols. Each set of 16 pixels (2 rows of 8 pixels) represent a symbol of the watermark with darker pixels (e.g., having a luminance value Y' of 16) representing a symbol of 0 and lighter pixels (e.g., having a luminance value Y' of 50) representing a symbol of 1. The luminance value and/or chrominance component of the pixels may be selected based on the non-watermark portion of the frame to reduce a perceptibility of the watermark. As such, black and white (e.g., a luminance value Y' of 0 and 100 respectively) may not be selected.

The quantity of rows and/or pixels representing a single symbol of a watermark may be selected based on the signal quality of the video. For example, a high signal quality (e.g., little noise and/or loss, etc.) may use a single row. Watermark 210 illustrates a watermark comprising single row of pixels representing a same sequence of symbols as watermark 201. Alternatively, or additionally, a high signal quality may use less pixels per row to represent a single symbol (e.g., 4 pixels in a row, 2 pixels in a row, 1 pixel, or the like). Likewise, a poor-quality signal may use additional pixels per row or additional rows. Using additional pixels and/or rows per symbol may reduce the quantity of symbols that can be included in a single video frame but increases the likelihood that the watermark can be detected and decoded correctly. A media device may transmit an indication of a current signal quality to a remote server. The remote server may then modulate the watermark in each frame to increase the likelihood that the watermark may be detected and reduce the likelihood that the watermark noise or other artifacts affect the watermark.

Figure 3:
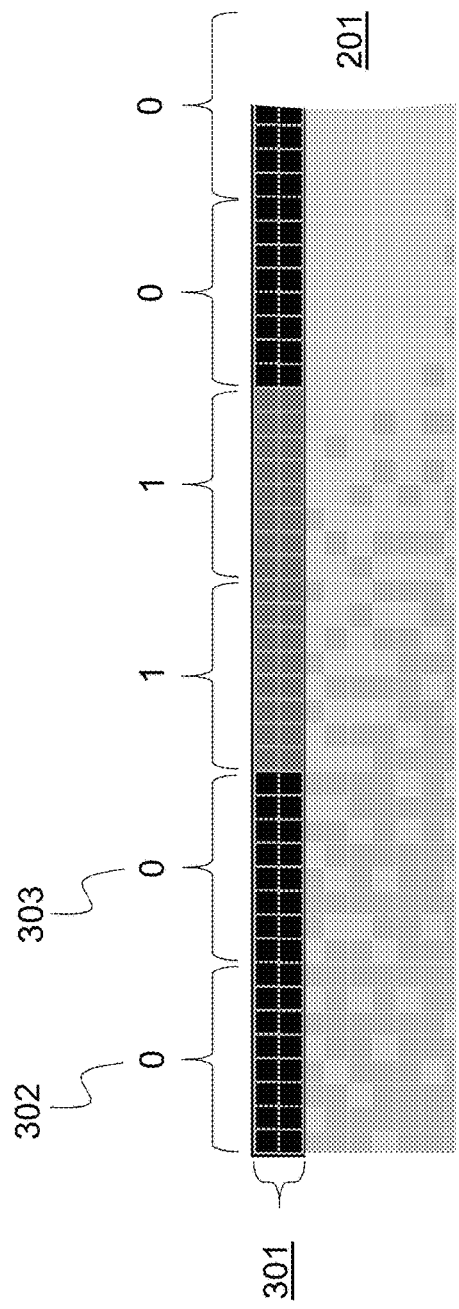
FIG. 3 illustrates an example watermark with a strengthened lead-in data symbol sequence to strengthen the detection of a watermarked frame according to aspects of the present disclosure.

FIG. 3 illustrates an example watermark with a strengthened lead-in data symbol sequence to strengthen the detection of a watermarked frame according to aspects of the present disclosure. Watermarks may include sets of pixels that each represent a symbol of a binary code. The quantity of pixels in the set of pixel representing a symbol may be referred to as the pixel size of the symbol. In some instances, the pixel size may be 4 pixels (if the watermark is 1 row) or 8 pixels (if the watermark is 2 rows). The pixel values of the set of pixels may correspond to approximately a same pixel value. Alternatively, the pixel values of the set of pixels may correspond to similar pixel values (e.g., within a range).

A watermark may begin with a predetermined pattern of data that signals the start of the watermark (known as a lead-in pattern). The predetermined pattern may be positioned in the first 8 or 16 symbols of the watermark. The media device may first determine if the predetermined pattern is detected in the first x pixels of the video frame (e.g., the quantity of pixels per symbol*the number of symbols in the predetermined pattern of data). If the predetermined pattern is detected, the media device may continue decode the remaining pixels in that row.

The lead-in pattern in watermarks may be adjusted to increase the likelihood that the watermark will be detected by the media device. For example, the pixel size of each symbol may be increased. By increasing the pixel size of each symbol, the lead-in pattern may be more reliably decoded by media devices. In some examples, the pixel size of each symbol of the lead-in pattern may be doubled (e.g., as shown). The pixel size of the rest of the symbols of the watermark may not be adjusted. For instance, if the lead-in pattern is 8 symbols with a pixel size of 4, then only lead-in pattern may take up the first 64 pixels (e.g., pixel size of 8 per symbol with 8 symbols) and the pixel size of the symbols after the lead-in pattern may remain at 4. The lead-in pattern may be especially useful when watermarked frames occur periodically among a large quantity of video frames that do not include watermarks.

In the example, shown watermark 301 includes a lead-in pattern with increased pixel size per symbol. The symbols of the lead-in pattern a represented by double the pixel size (e.g., 2 rows of 4 to 2 rows of 8). For example, symbol 302 and 303 are represented by 16 pixels instead of 8. The increased pixel size per symbol continues for the length of the lead-in pattern (e.g., 8-16 symbols or up to 256 pixels). At the end of the lead-in pattern and for the remainder of the watermark in that video frame, the pixel size if each symbol is not increased (e.g., 2 rows of 8). The lead-in pattern may include a pixel size per symbol that is increased by any amount such as, but not limited to, double the regular pixel size per symbol, triple the regular pixel size per symbol, a fraction of the regular pixel size per symbol, a multiple of the regular pixel size per symbol, or the like).

Figure 4:
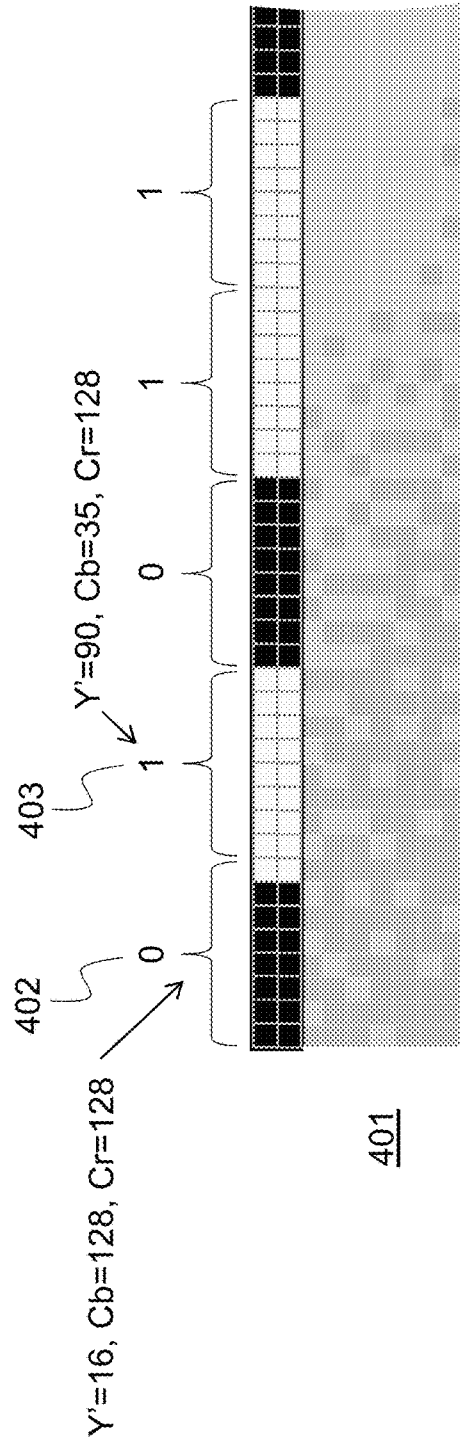
FIG. 4 illustrates an example of data symbols of a watermark in which the Euclidean distance between the zero and one symbols is temporarily increased according to aspects of the present disclosure.

FIG. 4 illustrates an example of data symbols of a watermark in which the Euclidean distance between the zero and one symbols is temporarily increased according to aspects of the present disclosure. Watermarks may be encoded into a video frame by modulating the pixel value of a set of pixels such as the pixels in the top two rows of the video frame. Modulating the pixel values may be include selecting two luminance values to represent two symbols of a binary code. The two luminance values may be selected based on a likelihood that the media device may detect each symbol in the presence of noise or the like and a likelihood that the watermark will not be perceived by a user of the media device. If the luminance values for the first symbol and the second symbol are too close together signal noise may prevent the media device from accurately determining if a set of pixels represents a first symbol or a second symbol. The closer the luminance values for the first symbol and the second symbol are the less likely a user will perceive the watermark. The luminance values may be selected as the smallest difference that provides a threshold likelihood that the media device will be able to detect and accurately decode the symbol sequence of the watermark. In some instances, the difference may be approximately 40 such that pixels representing the first symbol may have a luminance value of approximately 5-15 and pixels representing the second symbol may have a luminance value of approximately 45-55.

Signal noise may induce errors in the decoded symbol sequence when the luminance difference between symbols is minimal (e.g., the approximately 40). To reduce the likelihood of errors in the decoded symbol sequence, an error correction watermark may be inserted into one or more video frames of a set of video frames that are to include the watermark. The error correction watermark may include a higher difference between the luminance values representing the first symbol and the luminance values representing the second symbol. In some instances, the difference between the high luminance value and the low luminance value for the error correction watermark may be approximately 80 such that pixels representing the first symbol may have a luminance value of approximately 10-20 and pixels representing the second symbol may have a luminance value of approximately 75-85. When the media device receives the error correction watermark, the larger difference in luminance values between symbols increases a likelihood that the media device may detect and decode the symbol sequence correctly. The next video frame may include the regular watermark with the regular (smaller) difference in luminance values between symbols.

The error correction watermark may be embedded into multiple frames of the set of frames. For example, the error correction watermark may be inserted every 'n' frames. Alternatively, or additionally, the error correction watermark may be inserted in one or more adjacent video frames each time the error correction watermark is inserted. For instance, each time the error correction watermark is inserted into a video frame, the error correction watermark may also be inserted into one or more subsequent frames (e.g., for m-1 frames). That is, each time the error correction watermark is inserted, it may be inserted into 'm' video frames.

Alternatively, or additionally, when an average luminance of the video frame is high (e.g., greater than a first threshold), the pixels of the watermark may be modulated such that the difference in luminance values between pixels representing the first symbol and pixels representing the second symbol is approximately 80 (e.g., using luminance values of approximately 10-20 to represent the first symbol and luminance values of approximately 70-80 to represent the second symbol, or any luminance values where the difference between them is approximately 80). When an average luminance of the video frame is low (e.g., less than a second threshold), the pixels of the watermark may be modulated such that the difference in luminance values between pixels representing the first symbol and pixels representing the second symbol is approximately 40 (e.g., using luminance values of approximately 10-20 to represent the first symbol and luminance values of approximately 45-55 to represent the second symbol, or any luminance values where the difference between them is approximately 40). Additionally, when the average luminance of the video frame is low, the pixels of the watermark may have a color channel, such as Cr, adjusted between extreme values for the zero and one symbol colors. The first threshold and the second threshold may be predetermined or dynamically determined based on pixel values of the video frame. In some instances, the first threshold may be equal to the second threshold. In other instances, the first threshold may be difference from the second threshold.

An alternative error correction process may include embedding a same watermark into multiple adjacent video frames or multiple instances of the same video frame (each including the same watermark). By transmitting a same watermark more than once, the media device may be better able to recover data that may be distorted by the video distribution path (e.g., from the source to the media device). If the lead-in pattern is detected but the remainder of the video does not decode reliably, the averaging of video values of the subsequent video frames of the group can increase the signal-to-noise ratio to provide decodable data. In some instances, the media device may average the pixel values of each instance of the same watermark before decoding watermark into the symbols The media device can identify related video frames (whether two or more in the group) by a unique lead-in pattern in the first watermark of a group of video frames that are to include a same watermark. The unique lead-in pattern may indicate the quantity of frames included in the video frame based on the unique lead-in pattern being associated with a known quantity of video frames or based on the symbols of the unique lead-in pattern indicating how many of the next video frames will include the same watermark. Alternatively, first lead-in pattern may be used to indicate the start of a group of video frames and a second lead-in pattern may be used to indicate the last frame in the group of video frames. The alternative error correction process may be combined with other processes as described herein including the error correction watermark as previously described.

Figure 5:
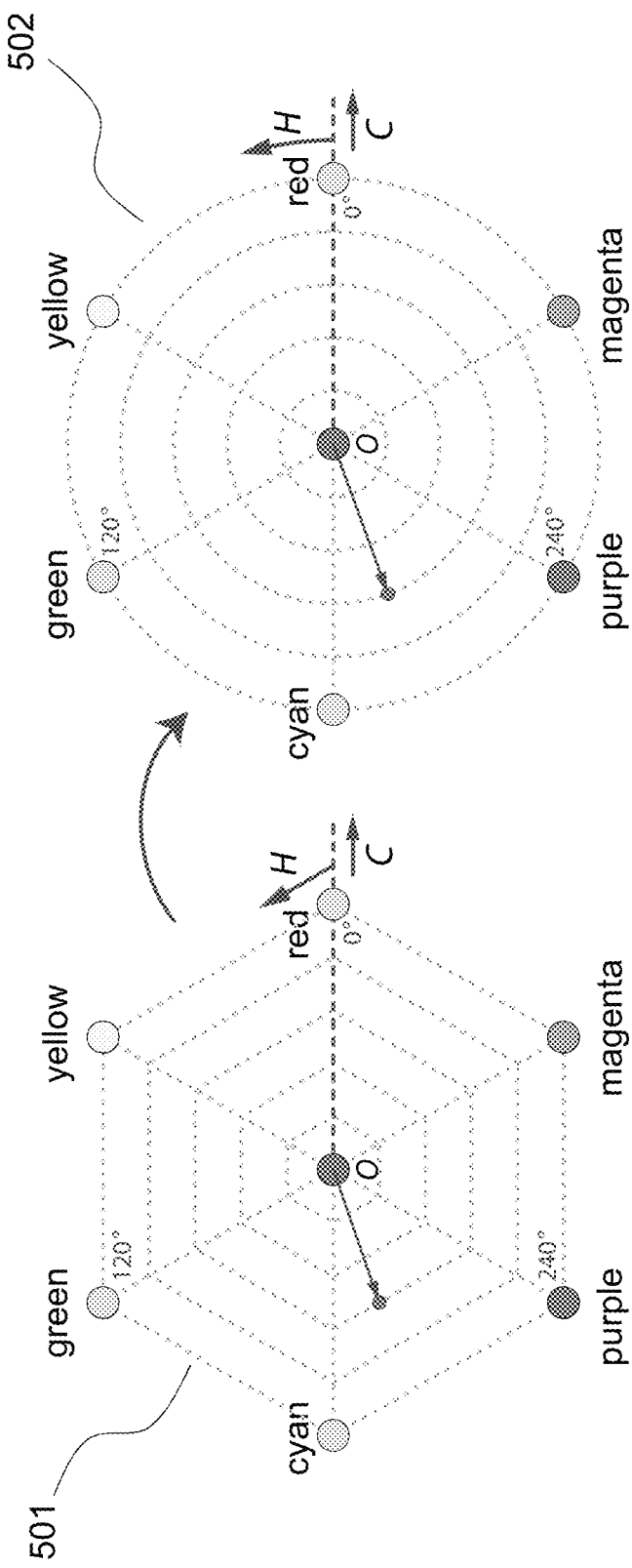
FIG. 5 illustrates example luminance/chrominance sub-sampling formats of 4:4:4, 4:2:2, 4:2:0, and 4:1:1 according to aspects of the present disclosure.

FIG. 5 illustrates an effect of the mathematical representation of HSL transforming hexagons 501 into circles 502 according to aspects of the present disclosure. Pixels may be represented in a number of different formats such as, but not limited to, an RGB (Red, Green, Blue) color model, HLS (hue, saturation, lightness), luminance/chrominance (Y/C) systems, etc. The representation of pixel information in any one format and its translation in another format may be exploited based on the media device, the nature of human perception, and the video source. For instance, since human visual perception is relatively insensitive to changes in hue, the hue information may be compressed more so than lightness. If some of the hue information is lost due to the degree of compression, is unlikely to cause human perceptible artifacts.

Pixels may be represented by three values hue, H, saturation, S, and lightness, L of the HSL color space. HSL is an alternative representation of the RGB color model. In the HSL representation, colors of each hue may be arranged in a radial slice, around a central axis of neutral colors which range from black at the bottom to white at the top. The HSL color space may model the way physical paint in different colors mix, with the saturation dimension resembling various shades of brightly colored paint, and the lightness dimension resembling the mixture of those paints with varying amounts of black or white paint. The HSL model may resemble more perceptual color models such as the Natural Color System (NCS) or Munsell color system, placing fully-saturated colors around a circle at a lightness value of one-half, where a lightness value of 0 corresponds to black and a lightness value of 1 represents white.

The hue and chroma (e.g., attribute indicating the colorfulness relative to brightness) in the HLS representation may be defined with respect to a hexagonal representation 501

(e.g., the projection of a three-dimensional RGB color space onto a two dimensional plane). Chroma, C, is the proportion of the distance from the origin to an edge (e.g., C=range(R, G,B)=max(R,G,B)−min(R,G,B)). Hue, H, is the proportion of the distance around the edge of hexagon 501, which passes through the projection point. Since hue may be undefined for projection points that project onto the origin in the, hue is mathematically defined piecemeal (e.g., H=60°−H'). H' may have four definition depending the value of chroma and/or RGB such that when C=0, H' is undefined, when max(R,G,B)=R, H'=G−B/Cmod(6), when max(R,G,B)=G, then H'=B−R/C+2, and when max(R,G,B)=B, then H'=R−G/C+4. The definitions of chroma and hue amount to a geometric warping of hexagonal representation 501 into circle representation 502.

Figure 6A:
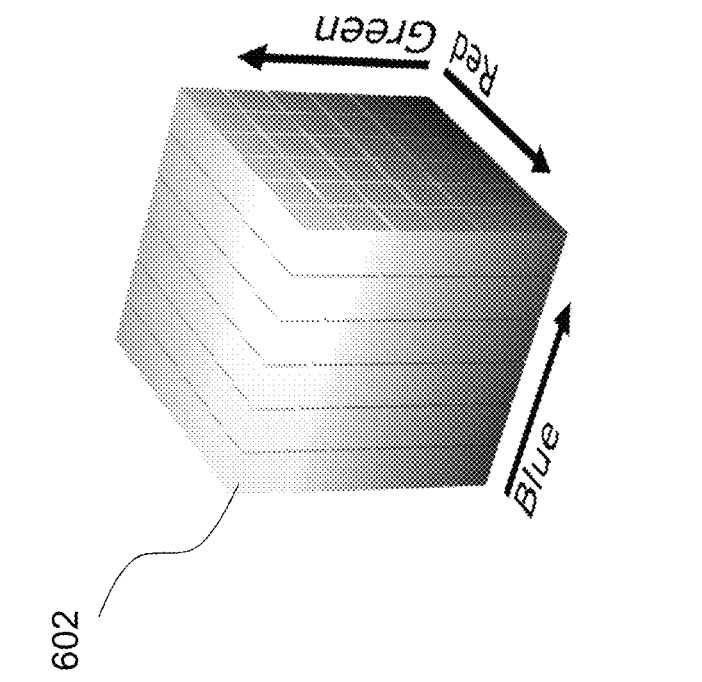
FIG. 6 illustrates a graph depicting the RGB color space within the Y'CbCr color space according to aspects of the present disclosure.
Figure 6B:
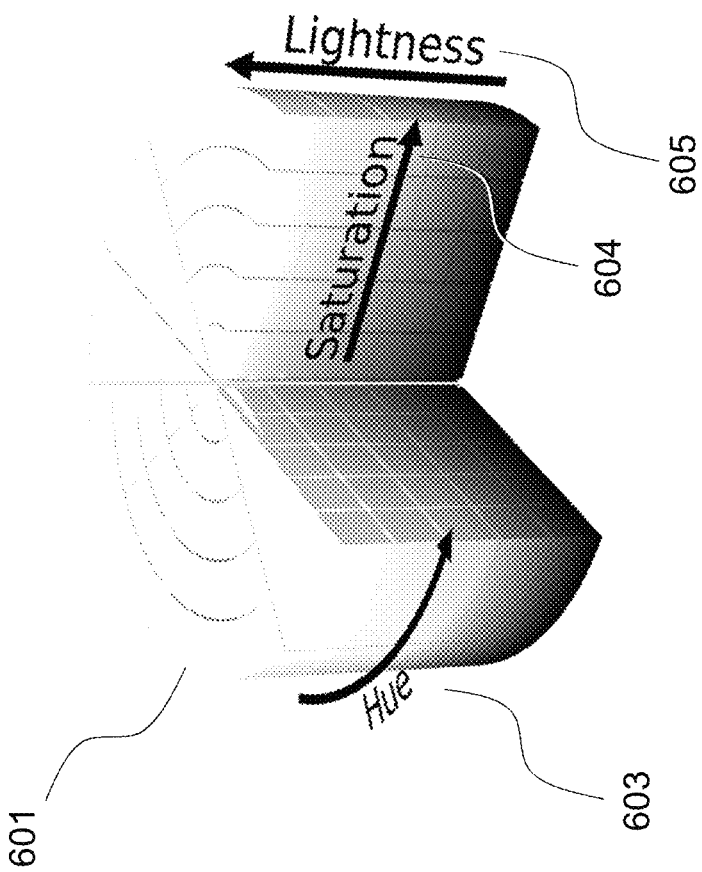

FIGS. 6A and 6B illustrates a relationship between the HSL and RGB color spaces according to aspects of the present disclosure. As shown in FIG. 6A, HSL can be represented by cylinder 701. Hue 603 (the angular dimension in both color spaces represented by the "hue" arrow) may start at the red primary at 0° and pass through the green primary at 120°, the blue primary at 240°, and then wraps back to red at 360°. In each geometry, the central vertical axis may represent lightness. The central vertical axis may comprise neutral, achromatic, or gray colors, ranging from black at lightness 605 of 0% (value 0) at the bottom of the cylinder, to white at lightness 605 of 100% (value 1) at the top of the cylinder.

The additive primary and secondary colors (red, yellow, green, cyan, blue and magenta) and linear mixtures between adjacent pairs of those colors (sometimes referred to as pure colors) may be arranged around the outside edge of the cylinder with saturation 1 (saturation 604 represented by the "saturation" arrow). The saturated colors may have a lightness 605 of 50% in HSL. Mixing these pure colors with black, producing so-called shades, may leave saturation 804 unchanged. In HSL, saturation 604 may also be unchanged by tinting with white. Mixtures with both black and white (referred to as tones) may have a saturation 604 of less than 100/0.

FIG. 6B illustrates an example diagram of a cubic representation 602 of the red-green-blue (RGB) color space. The mathematical relationship between the RGB and HSL color space can be represented by $H=\cos^{-1}((0.5(R-G))+(R-B))/((((R-G)2)+((R-B)(G-B)))^{0.5})$, $S=1-(3/(R+G+B))*\min(R,G,B)$, and $L=R+G+B/3$. Because these definitions of saturation, conflict with the intuitive notion of color purity, often a bi-conic representation (also referred to as a cone) may be used instead.

Figure 7:
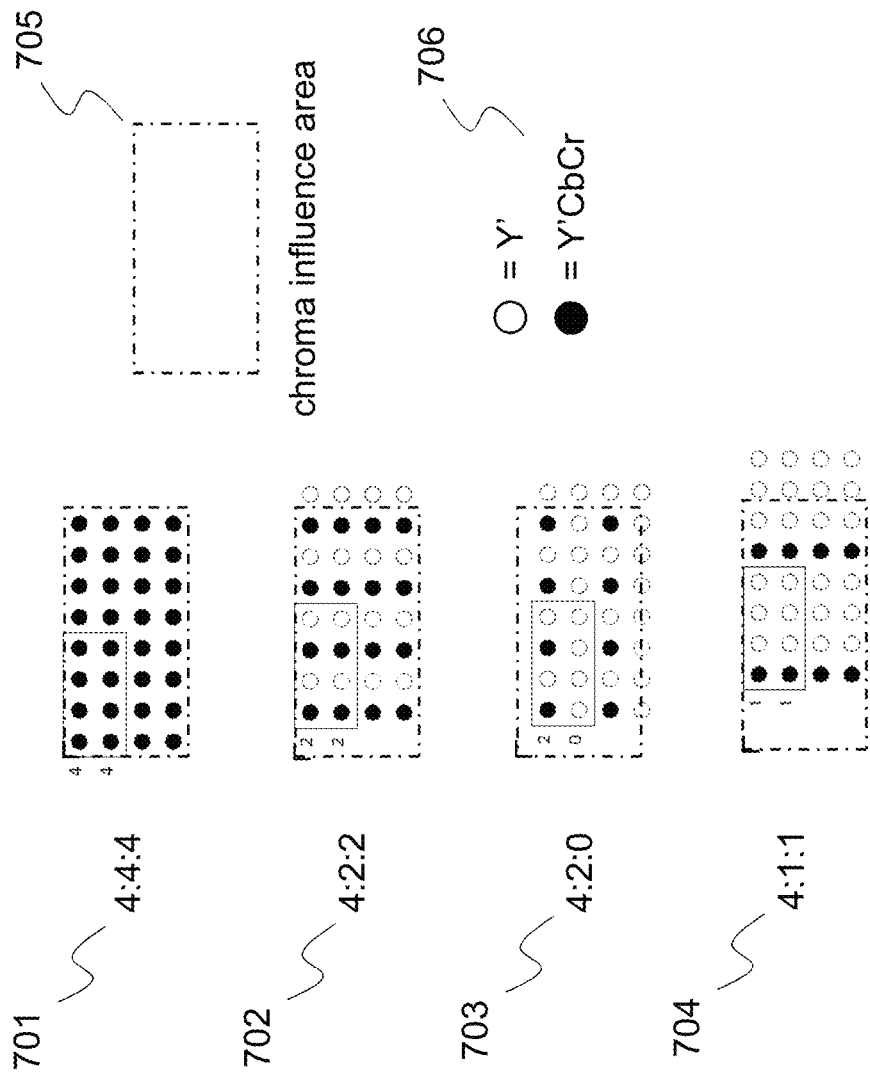
FIG. 7 illustrates an effect of the mathematical representation of HSL transforming hexagons into circles according to aspects of the present disclosure.

FIG. 7 illustrates example luminance/chrominance subsampling formats of 4:4:4, 4:2:2, 4:2:0, and 4:1:1 according to aspects of the present disclosure. Luminance/chrominance or Y/C systems (such as Y/C or Y'CbCr) may be variations of HSL color spaces. These variations include "color-difference" components or values derived from blue minus luminance (U and Cb) and red minus luminance (V and Cr). Since the human eye may have less spatial sensitivity to color than luminance, the U and V color signals of the Y'UV system, the principle components of the C signal, can be substantially compressed through chroma subsampling. For example, in some instances, only half of the horizontal resolution compared to the brightness information can be included in a video signal.

Chroma subsampling format 701 illustrates a frame with full 4:4:4 ratio, chroma subsampling format 702 illustrates a 4:2:2 ratio, and chroma subsampling format 703 illustrates a 4:2:0 ratio, where the vertical resolution is halved. The 4:x:x representation can convey the ratio of luminance to chrominance components. For example, chroma subsampling format 704 illustrates a 4:1:1 chroma, in which the horizontal color resolution is quartered (as shown by the empty dots), while the vertical color resolution is full resolution (as shown by the solid dots). In this example, a video frame may include a quarter of the color resolution compared to brightness resolution. Chroma subsampling format 701 with the 4:4:4 ratio may provide identical resolution for both brightness and color information and is equivalent to the RGB values of raw video.

Y/C systems may be a way of encoding RGB information, and the actual colors that are displayed may depend on the original RGB color space used to define the system. That is, the color space may be defined by how deep the red, green, and blue color primaries are (e.g., referred to as the color gamut). The values expressed as Y'UV or Y'CbCr may be translated directly back to the values of the original set of primary colors of red, green, and blue. The range of colors and the brightness of RGB may be far smaller than the range of colors and brightnesses encoded by Y'UV. This may be determined when converting from Y'UV or Y'CbCr to RGB, as the conversions may result in "invalid" RGB values. The systems and methods described herein may detect and correct invalid RGB values in video frames that include invalid RGB values in watermarks.

Figure 8:
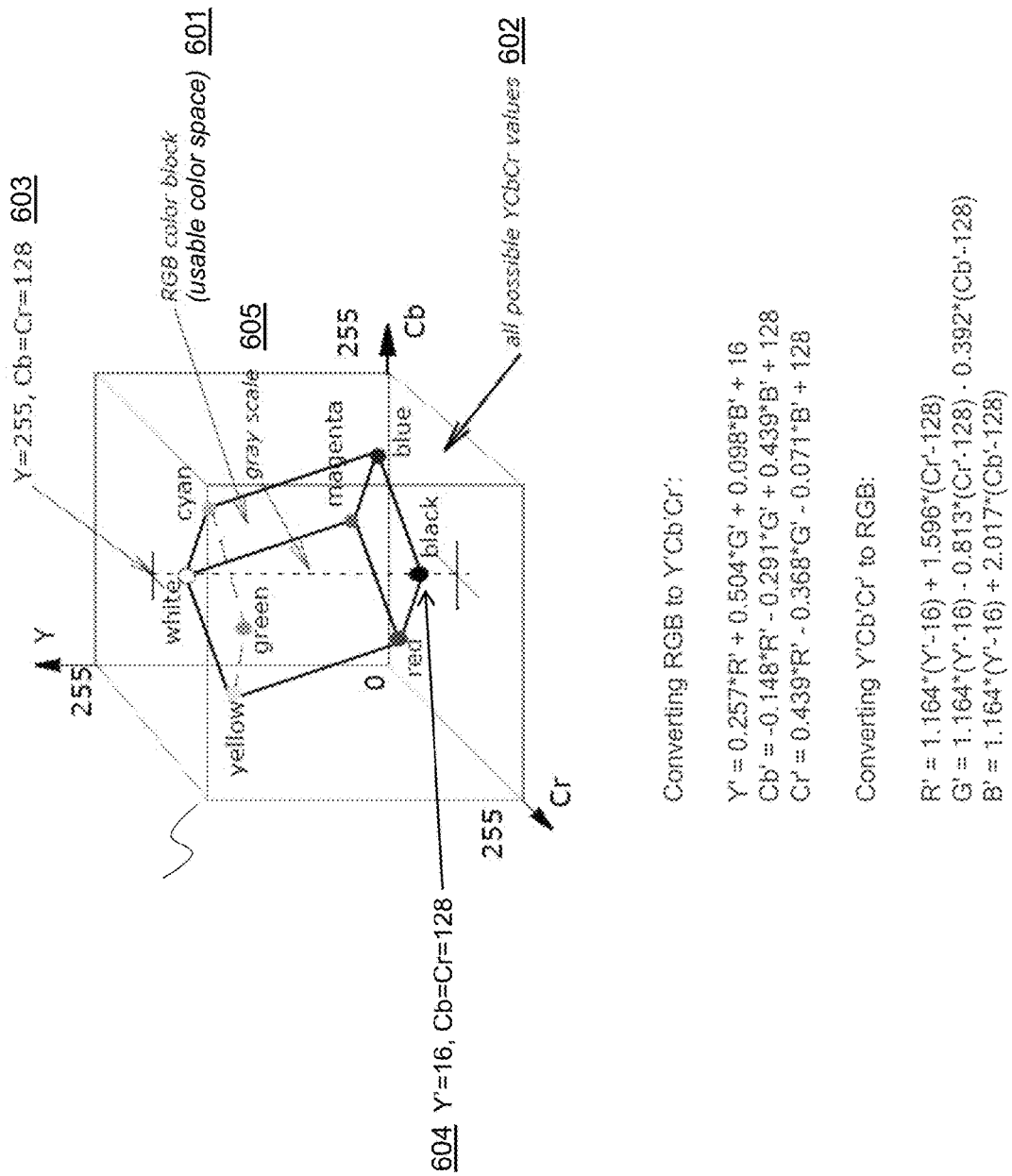
FIG. 8 illustrates a relationship between the HSL and RGB color spaces according to aspects of the present disclosure.

FIG. 8 illustrates a graph depicting the RGB color space within the Y'CbCr color space according to aspects of the present disclosure. The Y'CbCr color space (represented as block 802 for all possible Y'CbCr values) may be formed by balancing the RGB color space (represented as an RGB color block 801) on its black point 804, with the white point 803 directly above the black point. Though Y/C systems may translate directly to RGB, RGB can be converted to Y'Cb'Cr' by $Y'=0.257*R'+0.504*G'+0.098*B'+16$, $Cb'=-0.148*R'-0.291*G'+0.439*B'+128$, $Cr'=0.439*R'-0.368*G'-0.071*B'+128$. Y'Cb'Cr' can be converted to RGB by: $R'=1.164*(Y'-16)+1.596*(Cr'-128)$, $G'=1.164*(Y'-16)-0.813*(Cr'-128)-0.392*(Cb'-128)$, and $B'=1.164*(Y'-16)+2.017*(Cb'-128)$.

In an 8-bit encoding, the R, G, B, and Y channels may have a nominal range of [16 ... 235], and the Cb and Cr channels may have a nominal range of [16 ... 240] with 128 as the neutral value. In RGB, reference black is (16, 16, 16) and reference white is (235, 235, 235). In Y'CBCR, as shown in FIG. 6, reference black is (16, 128, 128), and reference white is (235, 128, 128). Values outside the nominal ranges are allowed, but typically they would be clamped for broadcast or for display. Values 0 and 255 can be reserved as timing references and may not contain color data. In a 10-bit encoding, nominal values may be four times those of the 8-bit encoding.

The parameters of hue, H, saturation, S, and lightness, L, can be manipulated to obscure a watermark embedded into a video frame. A watermark may be embedded into a video frame by modulating the H, S, and/or L values in such a way as to be detected by a media device, but not by a user of the media device. For example, in reference to FIG. 6A, it can be shown than for any hue 603 at a low or high lightness 605, the saturation 604 can be changed for a small area of the display screen without being noticeable to the human eye. Similarly, for a low or high lightness 605 for some colors, hue 603 can be shifted without being noticeable to the human eye. At near full lightness 605 (white) or near minimum lightness (black), hue 603 and saturation 804 can be shifted without creating a visible artifact.

Figure 9:
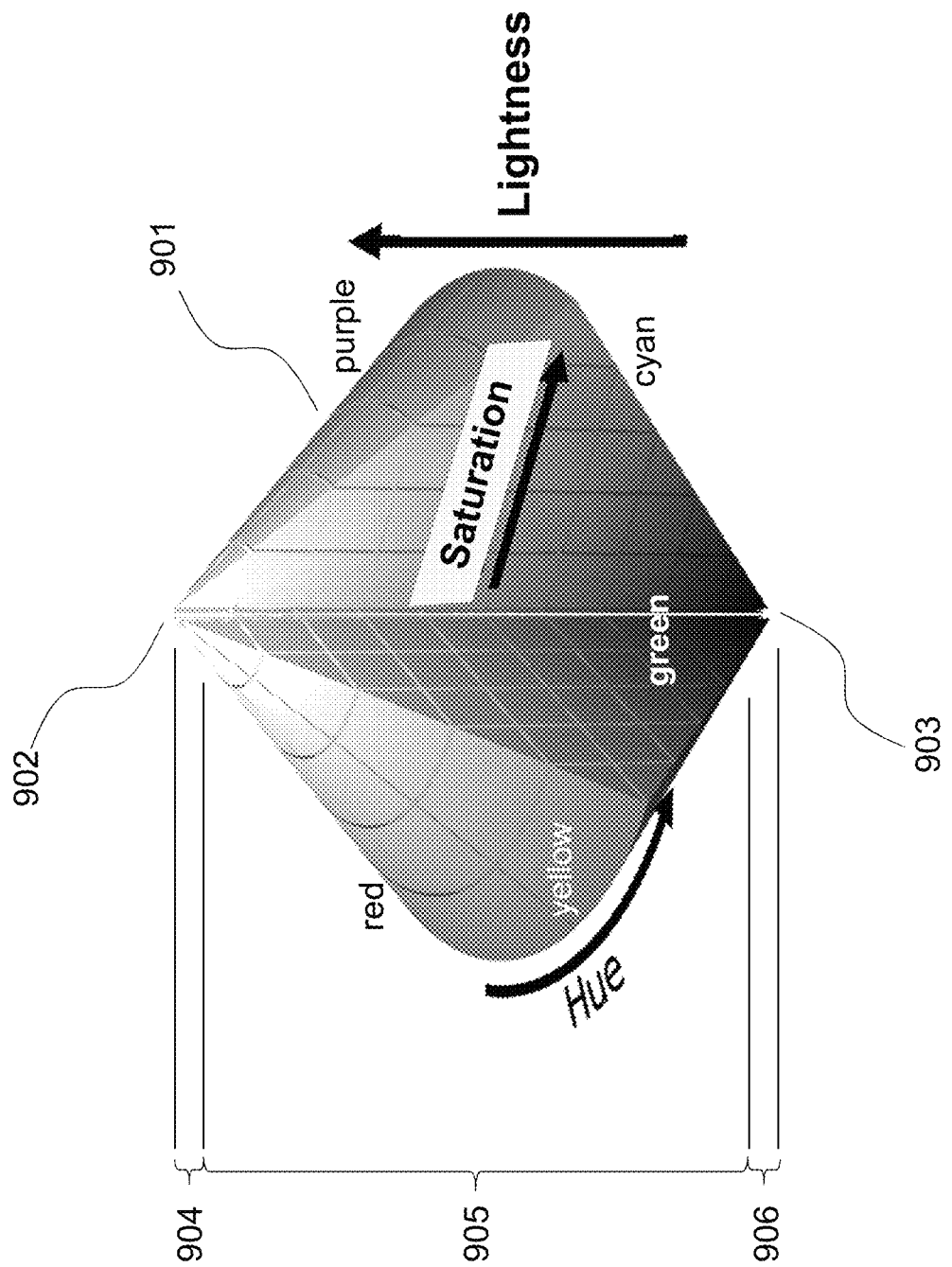
FIG. 9 illustrates a color space representation of HSL in a bi-conic representation that reflects the available range of saturation relative to lightness according to aspects of the present disclosure.

FIG. 9 illustrates a color space representation of HSL in a bi-conic representation that reflects the available range of saturation relative to lightness according to aspects of the present disclosure. The bi-conic representation 901 may be generated using the cylindrical representation 801 of FIG. 8A and generating two adjoined cones in a bi-conic shape 901 with white at the peak of the top cone and black on the peak of the bottom cone. The very top, white 902, may be a single data point where lightness is maximum, saturation is zero, and hue is indeterminant (when saturation is zero). No change in saturation, S, or hue, H, would change the corresponding value in RGB (which in an 8-bit system, would be 255,255, and 255, respectively). When lightness is minimum, black 903, saturation, S, would be zero and hue, H, would be indeterminant in the corresponding value an RGB (e.g., which in an 8-bit system, would be 0,0,0). The luminance value of 'Y' may have a range 905 of approximately 16 to 235 out of 0 to 255, optionally excluding ranges 904 and 906 at the margins of the luminance scale. The Cr and Cb values may have a range of 16 to 240 out of 0 to 255. As the color difference encoding consists of overlapping luminance and chroma values, not all values of Y'CbCr may translate to valid RGB values. For example, some combinations of values of Y'CbCr can translate to negative values of RGB. In some instances, the media device may correct for invalid values using one or more error corrections process. One such error correction process can include setting values that are below a minimum acceptable value (e.g., negative values) to the minimum acceptable value (e.g., 0 in an 8-bit color space) and values that are greater than a maximum acceptable value (e.g., greater than 255 in the 8-bit color space) to the maximum acceptable value (e.g., 255).

Figure 10A:
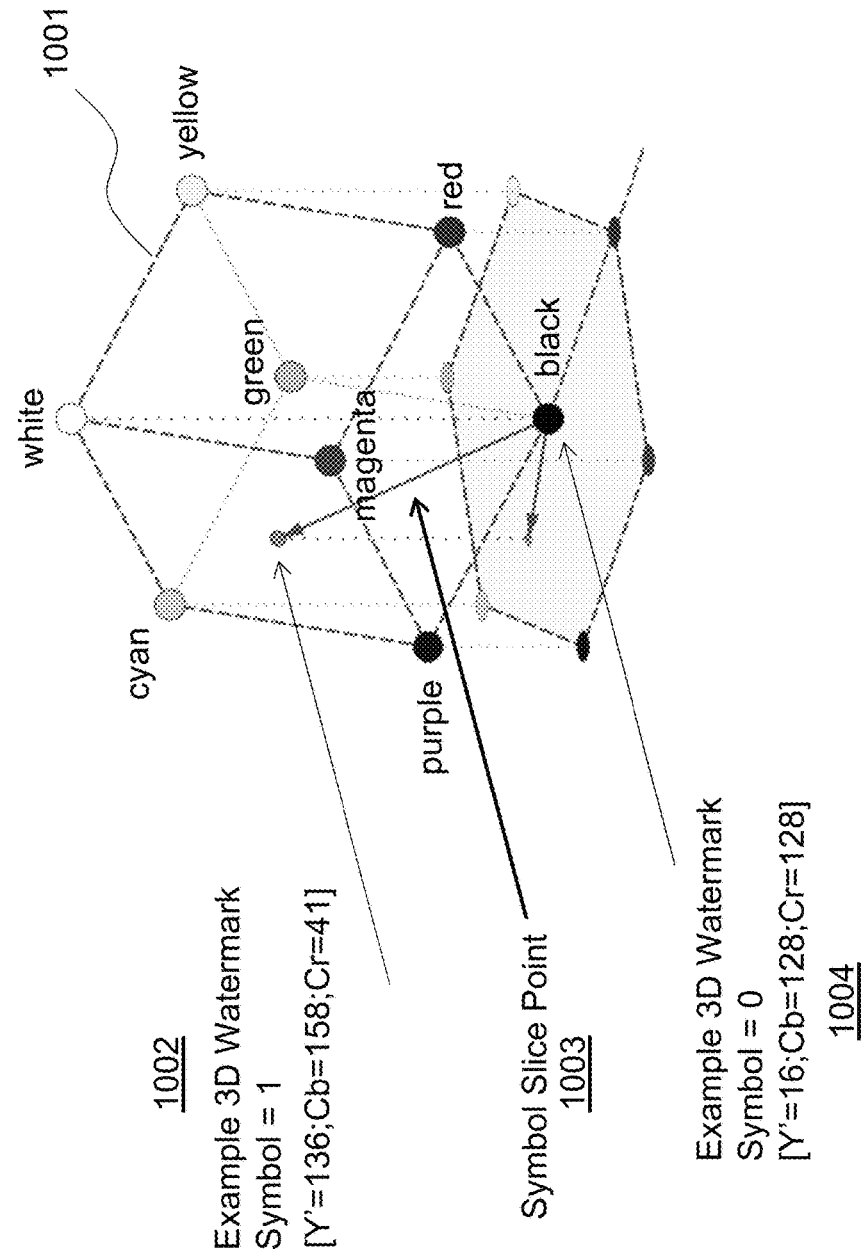
FIG. 10A illustrates a graph of an example set of 3D watermark symbols and its corresponding slice point according to aspects of the present disclosure.

FIG. 10A illustrates a graph of an example set of 3D watermark symbols and its corresponding slice point according to aspects of the present disclosure. Watermarks may be inserted into video frames by modulating pixel values of pixels located in a fringe portion of a video frame (e.g., such as the top one or two rows as described in FIG. 2). The modulation of the pixel values may be based on the luminance and chroma of nearby pixels to limit the perceptibility of the watermark. In some instances, the luminance value of the pixel may be used to represent symbols of a code. For instance, a luminance value of 10 may be used to represent a first symbol and a luminance value of 50 may be used represent a second symbol. The chrominance values may be determined based on the surrounding pixels (e.g., one or more rows of pixels adjacent to the watermark) and using the techniques described in FIGS. 5-9. Alternatively, the chrominance values may be used to represent the symbols of the watermark. In that instances, the luminance value may be similar to the luminance values of nearby pixels.

The watermark may be generated by modulating data in the three-dimensional space of the Y'CbCr color space 1001. The distance between a zero and one symbol becomes the Euclidean distance of the three-dimensional color space and can be expressed as: $D=((Y_1-Y_0)^2+(Cb_1-Cb_0)^2+(Cr_1-Cr_0)^2)^{1/2}$ The three-dimensional means of representing data may provide a greater distance between the pixel values representing the first symbol and the second symbol. The use of three-dimensional color space may provide the means to find pixel values for the symbols that match pixel values of surrounding pixels to reduce the perceptibility of pixel values selected for the symbols.

A first pixel value 1002 may be selected to represent a first symbol 1002 based on nearby pixels and a second pixel value 1004 may be selected by shifting the luminance value of the first pixel value and/or by selecting a pixel value with a known value (e.g., such as black, etc.). Pixel values of the watermark may vary based on the surrounding pixels (e.g., to reduce perceptibility of the watermark), signal noise, compression algorithms, and/or the like. The media device may determine if a pixel of the watermark corresponds to a first symbol or a second symbol using a symbol slice point 1003. This enables the pixel values to vary (ensuring reduced perceptibility) while ensuring the watermark can still be decoded. The symbol slice point 1003 may be selected as the midpoint between the first pixel value 1002 and the second pixel value 1004. The symbol slice point 1003 represents the point in which the media device will identify a pixel value of a pixel of the watermark as corresponding to the first symbol or the second symbol. If a pixel has a value between the symbol slice point 1003 and the first pixel value 1002, the media device determine that that pixel represents the first symbol. If a pixel has a value between the symbol slice point 1003 and the second pixel value 1004, the media device determine that that pixel represents the second symbol.

Figure 10B:
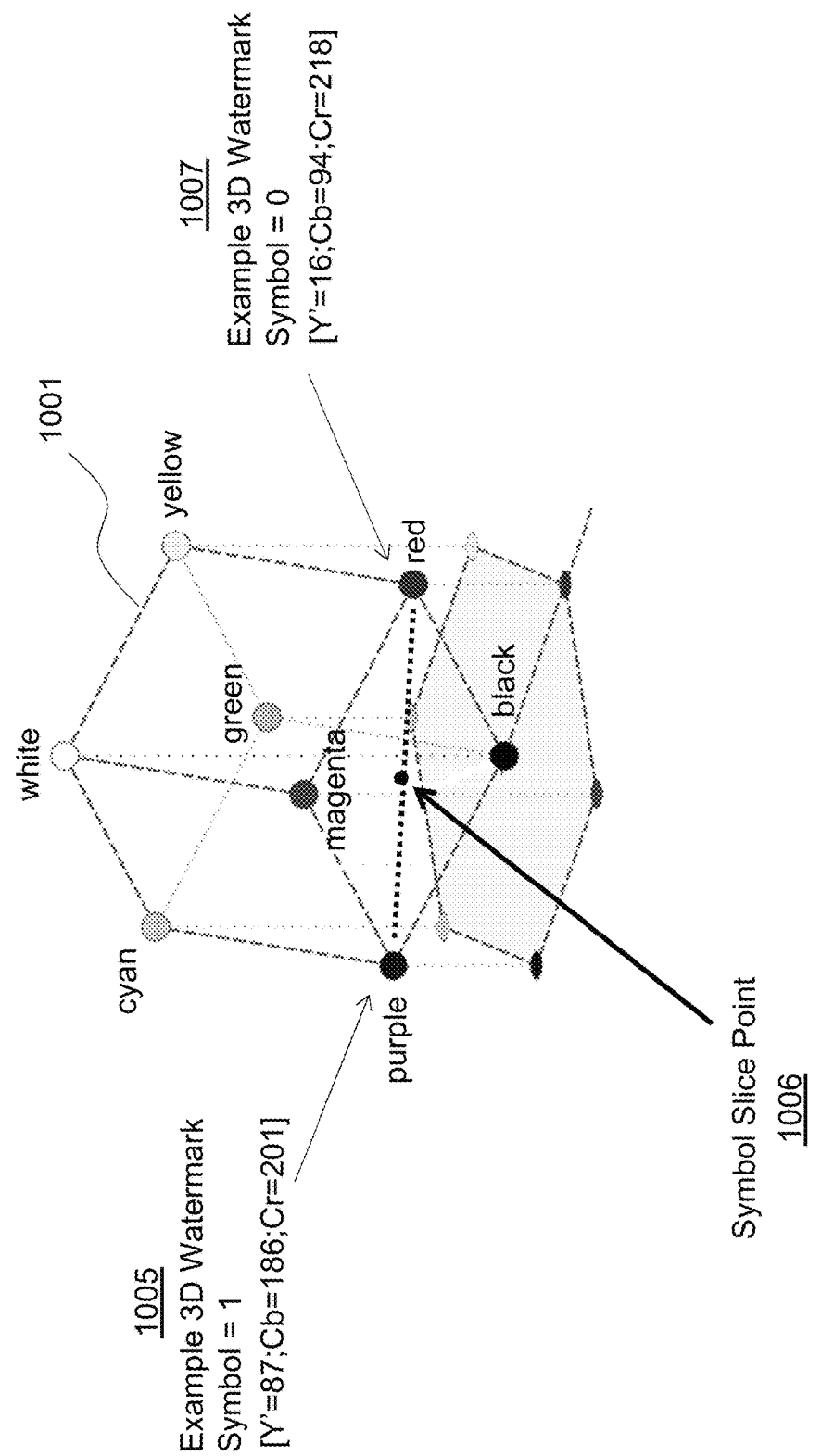
FIG. 10B illustrates a graph of another example set of 3D watermark symbols and its corresponding slice point according to aspects of the present disclosure

FIG. 10B illustrates a graph of another example set of 3D watermark symbols and its corresponding slice point according to aspects of the present disclosure. In the example shown, the first pixel value 1005 is selected as purple (Y'=87; Cb=186; Cr=201) and the second pixel value 1007 is selected as red (Y'=16, Cb=94' Cr=218). The symbol slice 1006 may be selected as the midpoint between the first pixel value 1005 and the second pixel value 1007. If a pixel has a value between the symbol slice point 1006 and the first pixel value 10005, the media device determine that that pixel represents the first symbol. If a pixel has a value between the symbol slice point 1006 and the second pixel value 1007, the media device determine that that pixel represents the second symbol.

Figure 11:
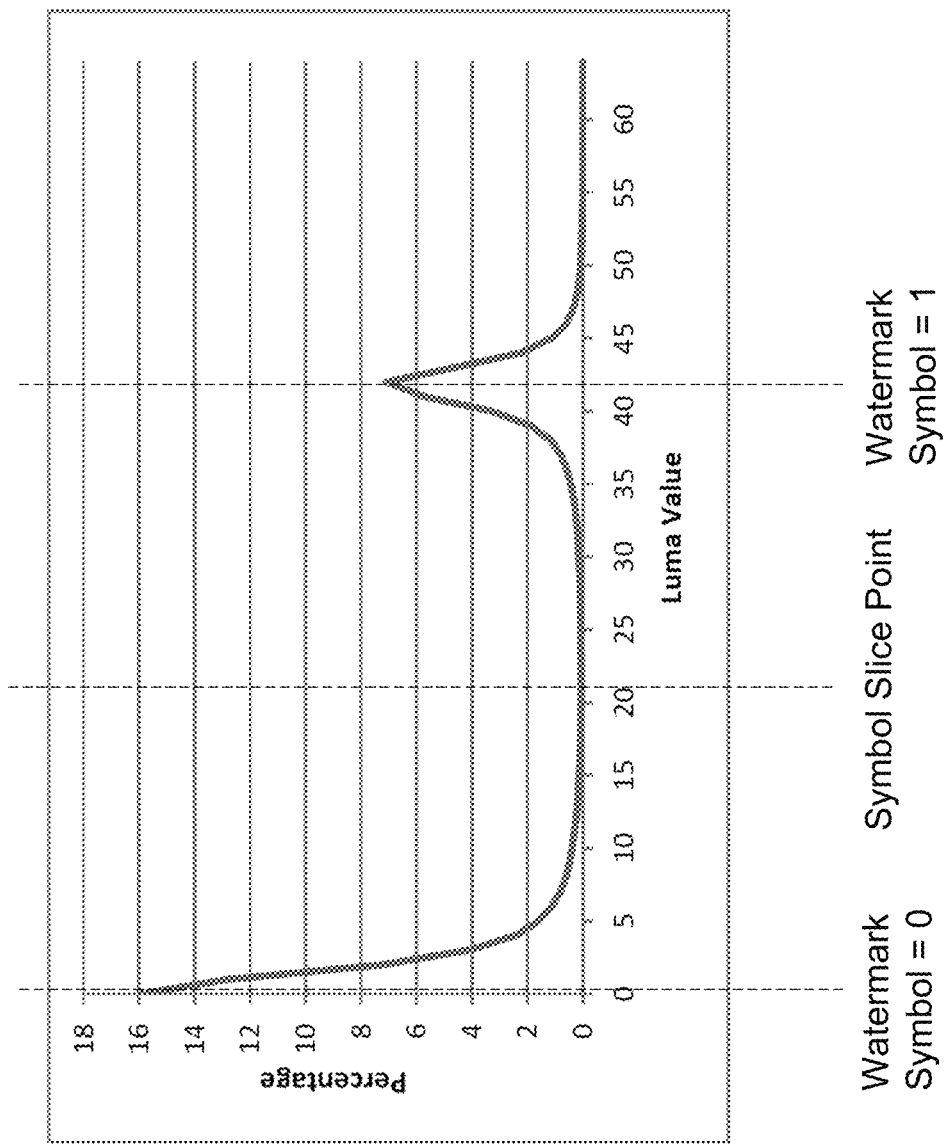
FIG. 11 illustrates a graph of the symbol slice point determination according to aspects of the present disclosure.

FIG. 11 illustrates a graph of the symbol slice point determination according to aspects of the present disclosure. The graph indicates the percentage of symbols detected at various luma values. The first pixel value (e.g., representing the first symbol) may have a luma value of approximately 0. The second pixel value (e.g., representing the second symbol) may have a luma value of approximately 42. A slice point is selected as the midpoint of 0 and 42 or 21. If a pixel has a luma value less than 21, then the media device determines the pixel represents the first symbol. If a pixel has a luma value greater than 21, then the media device determines the pixel represents the second symbol. The media device may still detect symbols when the luma value does not exactly correspond to the first pixel value or the second pixel value.

When the distance between the first pixel value and the second pixel value is greater than a threshold, the likelihood of decoding errors is reduced. For example, very few, if any, symbols are detected near the slice point where it may be difficult to determine whether a pixel value corresponds to the first symbol or the second symbol.

FIG. 12 illustrates an example video frame in which a transition region proximate to the watermark is darkened progressively to increase perceptual blurring of the watermark to the human eye according to aspects of the present disclosure. A boundary region may be generated between the watermark and the rest of the video frame. The boundary region may include one or more rows of pixels that are adjacent to the watermark. These rows be modified to cause a visual blending effect that reduces the perceptibility of the watermark. For instance, row 1201 and 1202 may be adjusted to a same value (e.g., proportional to the pixel values representing the symbols of the watermark). In some instances, each row may be independently adjusted to create a gradient. For instance, the luminance value, Y, of pixels of row 1201 may be reduced based on the pixel values representing the symbols of the watermark and the luminance value, Y, of pixels of row 1201 may also be reduced, but less than that of row 1201.

The boundary region may include any number of rows. A luminance gradient may be defined that is equal to the average luminance of the video frame divided by the number of rows in the boundary region. Then it is determined whether the average luminance of the video frame is higher or lower than the average luminance of the watermark. If the average luminance of the video frame is higher than the average luminance of the watermark, then the boundary region may shift dark closest to the watermark to light closest to the video frame (e.g., a lower luminance to a higher luminance). If the average luminance of the video frame is lower than the watermark, then the boundary region may shift from light closest to the watermark to dark closest to the video frame (e.g., higher luminance to lower luminance).

For example, if the average luminance of the video frame is higher than the average luminance of the watermark, then luminance value of the pixels of the first row of the boundary region (e.g., the row adjacent to the watermark) may be reduced based on the average luminance of the video frame (e.g., a value proportional to the average luminance of the video frame, or the like). The luminance of the next row of the boundary region (the next row further from the watermark) may be reduced by the amount the previous row was reduced minus the luminance gradient. The luminance of each subsequent row further from the watermark may be reduced based on the amount the immediately previous row was reduced minus the luminance gradient.

For another example, if the average luminance of the video frame is lower than the average luminance of the watermark, then luminance value of the pixels of the first row of the boundary region (e.g., the row adjacent to the watermark) may be increased based on the average luminance of the video frame (e.g., a value proportional to the average luminance of the video frame, or the like). The luminance of the next row of the boundary region (the next row further from the watermark) may be increased by the amount the previous row was increased minus the luminance gradient. The luminance of each subsequent row further from the watermark may be increased based on the amount the immediately previous row was increased minus the luminance gradient.

Alternatively, if the average luminance of the video frame is lower than a first threshold, then the boundary region may have a gradient from light closest to the watermark to dark furthest from the watermark. If the average luminance of the video frame is higher than second threshold, then the boundary region may have a gradient from dark closest to the watermark to light furthest from the watermark. The difference in the luminance values of each row may be a proportional value of the average luminance value of the watermark or the video frame. It should be noted that the first threshold may be equal to or different from the second threshold.

FIG. 13A illustrates an example sequence of video frames in which the values for zero and one symbols of a watermark alternate to cause a perceptual blurring of the watermark to the human eye according to aspects of the present disclosure. Since watermarks include a modulation of the pixel values to indicate two or more types of symbols (depending on the base code), the alternating pixel values may appear as a flickering to a user of the media device. The flickering may be reduced or eliminated by presenting a reversed form of the video frame in a subsequent video frame. A first version of a watermark may be embedded into frame 1. A second version of the same watermark may be embedded into frame 2. The second version of the watermark may be an inverted form of the first watermark. For example, each set of pixels having a luminance value representing the first symbol (e.g., a low luminance between 10-16) may be given the luminance value representing the second symbol (e.g., a high luminance between 45-55). Each set of pixels having a luminance value representing the second symbol may be given the luminance value representing the first symbol.

The media device, after receiving the first version of the watermark in frame 1 may expect the watermark in frame 2 to be inverted. When decoding the watermark in frame 2, the media device may invert the decoded symbols (e.g., each first symbol may be replaced with the second symbol, and each second symbol may be replaced with the first symbol). The media device may receive an indication of how many frames are to include a same watermark (e.g, in alternating inverted form) to ensure the watermark is detected and decoded correctly.

In some instances, the next frame (e.g., frame 3) may include an inverted watermark of the watermark included in the previous frame (e.g., frame 2), which is equal to the original watermark (e.g., in frame 1). The watermark may be inverted one or more times using two or more video frames. By inverting the pixels in alternating frames, the user may perceive the watermark as the average pixel values between the two frames. For example, if a first pixel is white and the inverted pixel is black, when displayed in quick succession, the two pixels will look gray (as shown). This may cause the watermark to appear as a solid color rather than flickering pixels. Increasing the number of times that the watermark is inverted, may decreases the likelihood that the watermark can be perceived but may reduce the quantity of data that can be transmitted with a given set of video frames. A quantity of frames over which the watermark is to be inverted, based on the quantity of data that is to be embedded into the watermark and the likelihood that the watermark may be detected.

Figure 13B:
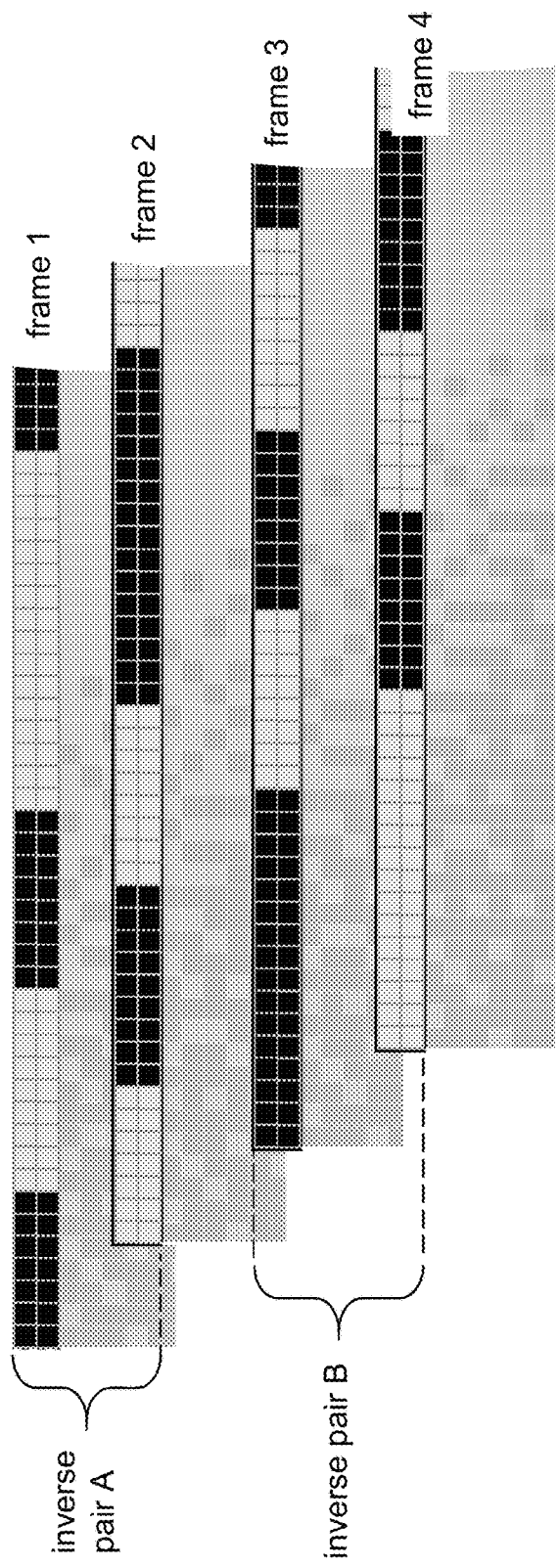
FIG. 13B illustrates an example video inversion of the data symbols every two frames to improve perceptual blending of the data symbols according to aspects of the present disclosure.

FIG. 13B illustrates an example video inversion of the data symbols every two frames to improve perceptual blending of the data symbols according to aspects of the present disclosure. In some instances, a sequence of watermarks may be inserted into a set of frames to transmit larger quantities of data to the media device. For example, frame 1 may include a first watermark and frame 2 may include an inverted form of the first watermark. Frame 1 and frame 2 may be referred to as inverse pair A. The next watermark in the sequence of watermarks may be embedded into frame 3 with the inverse of that watermark being embedded into frame 4 (e.g., inverse pair B). Each odd vide frame may include a new watermark in the sequence of watermarks and each even frame may include an inverted form of the watermark that was embedded in the immediately previous video frame.

When a sequence of watermarks is embedded into a set of video frames, it may be more perceptible to a user. The modulation of the pixels between video frames and watermarks may appear as flicker. By embedding a watermark and the inverted form of that watermark in successive video frames that flicker may be reduced or eliminated.

Figure 14:
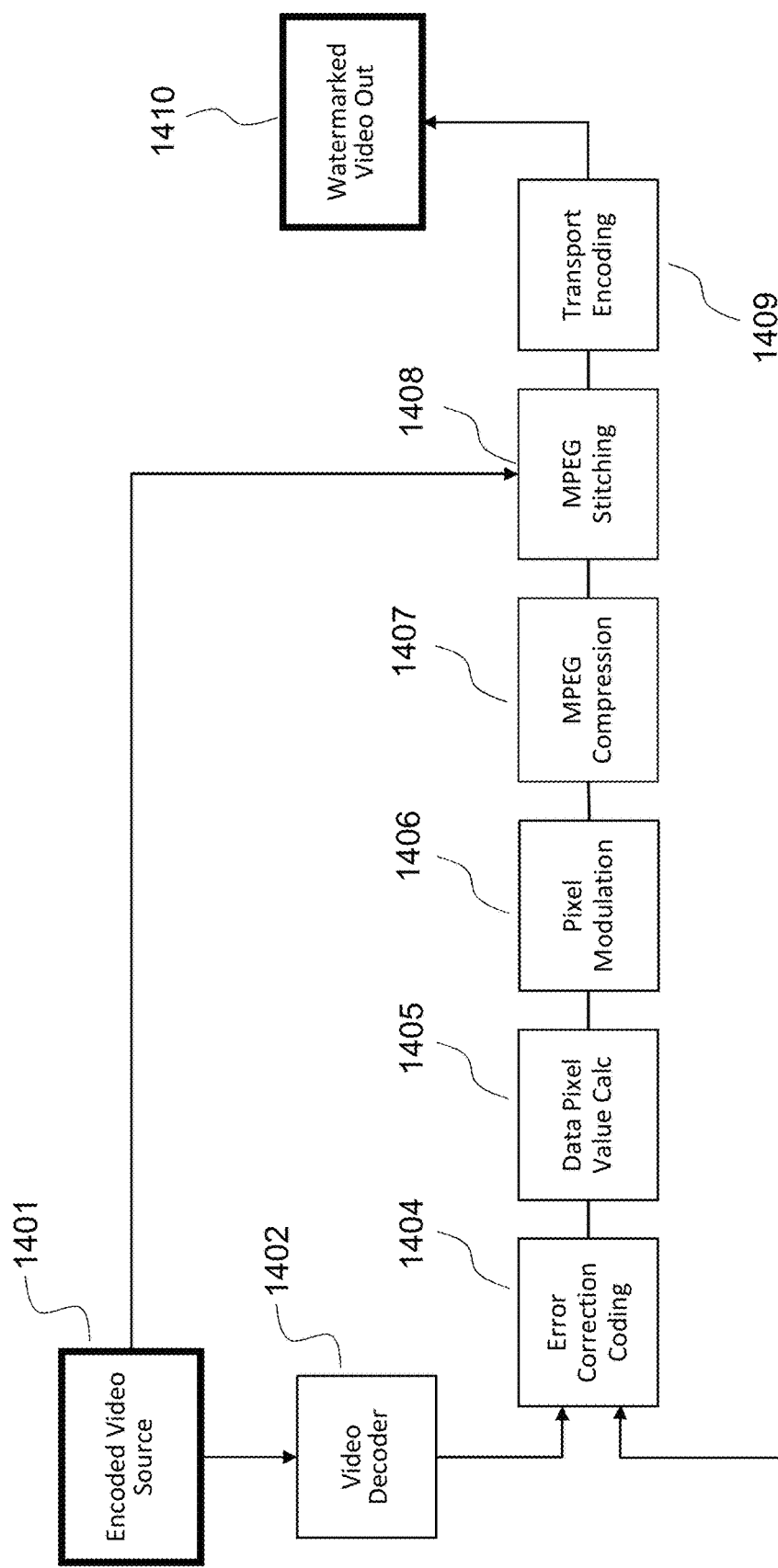
FIG. 14 illustrates a block diagram of an Encoding Flow Diagram for applying a watermark to a video frame according to aspects of the present disclosure.

FIG. 14 illustrates a block diagram of an encoding flow process for applying a watermark to a video frame according to aspects of the present disclosure. The encoding flow process may be performed by device that provide video services to media devices. The encoded video source 1401 (e.g., video data) is passed to a video decoder 1402. The decoded video from the decoder 1402 and watermark data 1403 is received by the error correction coding 1404. The error correction coding 1404 includes error correction codes into the data representing the video data and/or the watermark. This ensures the media device (e.g., television, set-top box, etc.) can apply error corrections to the data in the video frame and ensure the data can be decoded.

Next, the data pixel value calculation 1405 is derived for the watermark data 1403. To reduce the likelihood that the watermark will be perceived by a user, pixel values may be selected based on the color of surround pixels and/or luminance of surrounding pixels. Data pixel value calculation 1405 derives the approximate pixel values represent the symbols zero and one. Once the pixel values calculation 1405 is complete, the watermark can be embedded into the video frame by modulating pixels of the video frame. In some instances, the top one or two rows of pixels may be modulated to form the watermark in the video frame. The pixels may be modulated between a first pixel value to represent 0 and a second pixel value to represent 1 as determined by the data pixel value calculation 1405. The process continues to MPEG compression 1407 where the video frame is compressed then to MPEG stitching 1408 wherein the compressed video frame is stitched together with other video data from the encoded video source 1401. Since the watermark is located over a portion of the video frame blocks 1401-1406 may operate using only a portion of the video frame (e.g., a portion that is greater than the size of the watermark) MPEG stitching 1408 combines the portion of the video frame 1408 that includes the watermark with the remaining portion of the video frame.

Once the video frame is complete, the video frame is encoded for transmission 1409. The video frame may be encoded based on the transmission medium and/or communication protocol (e.g., broadcast television, a streaming protocol, or the like). Once encoded the video frame including the watermark is output at 1410.

Figure 15:
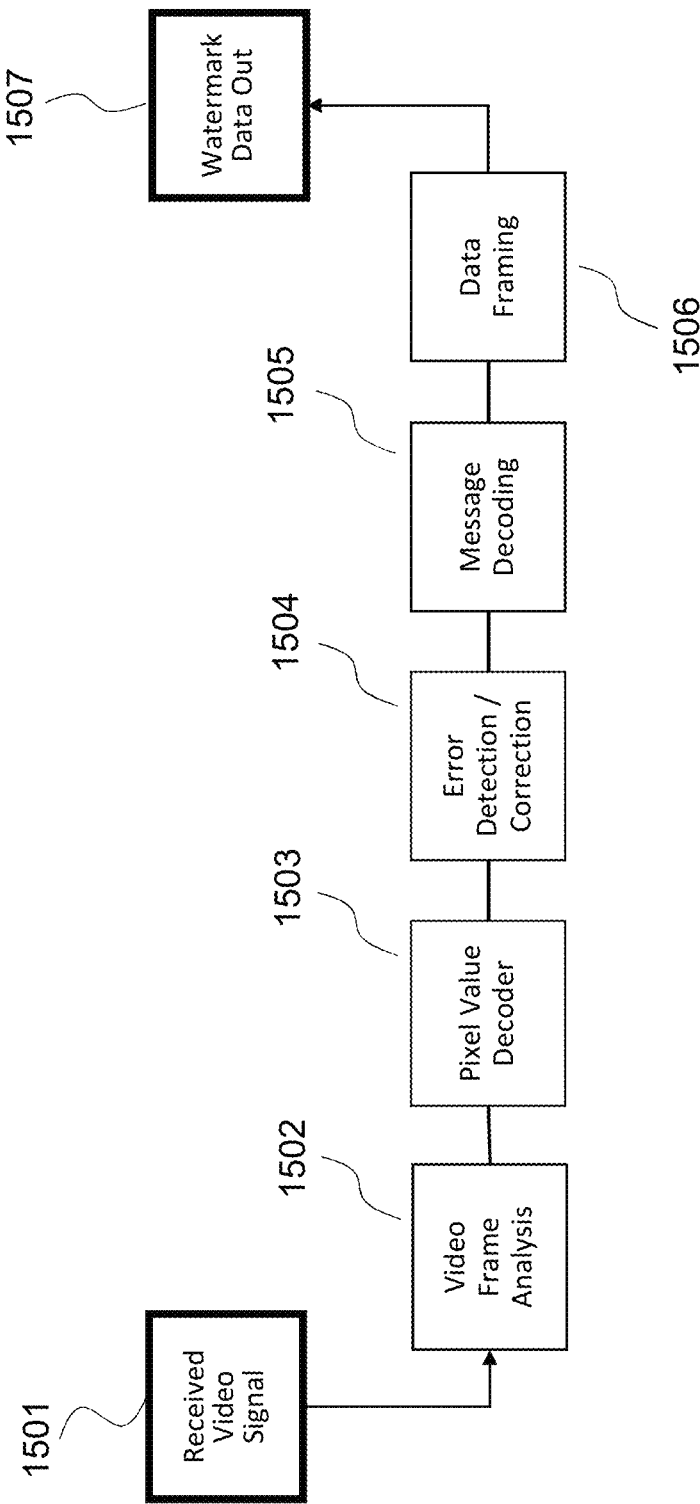
FIG. 15 illustrates a block diagram of a Decoding Flow Diagram for extracting the watermarked data from a video frame according to aspects of the present disclosure.

FIG. 15 illustrates a block diagram of a decoding flow process for extracting the watermarked data from a video frame according to aspects of the present disclosure. The decoding flow process may be performed by a media device (e.g., such as a television, set-top box, etc.). The decoding flow process may begin when a video signal 1501 is received. A video frame analysis 1502 is performed on the video signal to identify the presence of a watermark in a video frame of the video signal. In some instances, video frame analysis 1502 identifies a lead-in pattern that indicates the presence of a watermark. Pixel value decoder 1503 sets of pixels that correspond to symbols of a base-n symbol set. For example, in a base-2 symbol set (e.g., binary code), the pixel value decoder identifies pixels that correspond to the symbol 0 and pixels that correspond to the symbol 1.

Error detection/correction 1504 detects errors in the pixel values of the watermark and attempts to correct them. Errors may be introduced due to compression, noise, etc. and cause pixel values to be altered. Error correction may be performed according to one or more error correction process. One error correction process includes receiving a duplicate video frame and/or watermark and averaging the pixel values of the two video frames. Average pixel value reduces the effect of pixel values that have been altered due to compression, noise, etc. by reducing the difference between the altered pixel value and the true pixel value. Increasing the quantity of duplicate frames/watermarks further reduces the impact of any errors. Other error correction processes may be performed in addition to or in place of the duplicate-frame error correction process.

The code of the watermark may be decoded by message decoding 1505. Message decoding 1505 defines a sequence of symbols from each set of pixels that represents a symbol. Message decoding may strip the lead-in pattern from the sequence of symbols. The lead-in pattern is a subsequence symbols that indicates the presence of a watermark in a video frame but does not include any other data. The lead-in pattern can be removed from the sequence of symbols without reducing losing any of the data of the watermark.

Data framing 1506 organizes the sequence of symbols of each video frame. If a set of watermarks representing a large message or a large dataset is inserted into a set of video frames, data framing 1506 determines the order in which each sequence of symbols of each frame is to be positioned relative to other sequences of symbols. The decoded message is then output for further processing. For instance, if the watermark included executable code, a processor of the media device may then execute the executable code. The sequence of symbols of one or more watermarks may cause, for example, additional information associated with video content to be displayed, replace a video segment with another video segment (e.g., that is stored in cache memory, retrieved from a remote source, etc.), display a pop-up window, combinations thereof, or the like.

Figure 16:
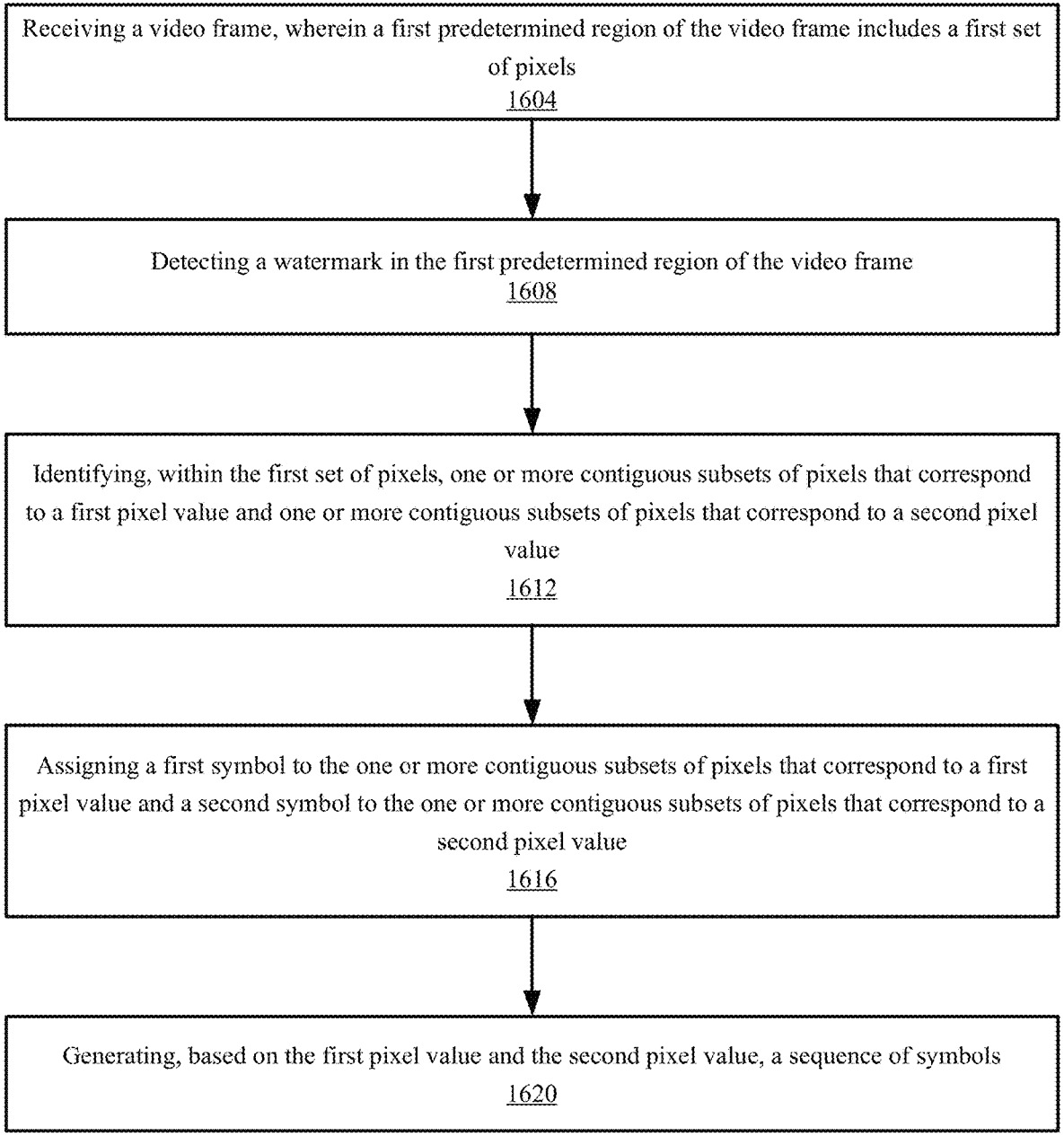
FIG. 16 illustrates a flowchart of an example process for decoding code from a watermark embedded in a video frame according to aspects of the present disclosure.

FIG. 16 illustrates a flowchart of an example process for decoding code from a watermark embedded in a video frame according to aspects of the present disclosure. At block 1604, a media device receives a video frame. The media device may device configured to process or display video such as, but not limited to, a monitor, television, set-top box, mobile device such as a smart phone, or the like. A first predetermined region of the video frame may include a first set of pixels that correspond to a watermark. For example, the first predetermined region of the video frame may be the top one or two rows of the video frame.

The frame may also include a second predetermined region that may be adjacent to the first predetermined region and includes a second set of pixels. The second set of pixels may have pixel values that are based on pixel values of pixels of a third predetermined region (e.g., the remainder of the video frame) of the video frame. For example, the second predetermined region of the video frame may be a boundary region. The boundary region may include one or more row of pixels that have a pixel value selected to reduce the perceptibility of the first predetermined region as described in FIG. 12. For example, if the boundary region includes two or more rows, the pixel values of each row are selected according to a gradient with each row (starting from the row closest to the first predetermined region) of the boundary region having a higher luminance value.

One or more watermark modification processes as previously described may have been performed on the video frame to reduce the likelihood that a user can perceive data embedded into the first predetermined region of the video frame. For example, the first predetermined region may include pixel values that are modulated (e.g., to convey data) that are within a predetermined range to reduce perceptibility. In that example, the difference in pixel values (e.g., luminance values) representing a first symbol and a second symbol may be limited to 40. One or more video frames may include a larger difference between in pixel values representing the first symbol and the second symbol (e.g., 80, or the like) as an error correction. In another example, a subsequent video frame may include a first predetermined region that is inverted such that when displayed in succession, the first predetermined region may appear as a solid color (e.g., the average of the first pixel value and the second pixel value). Any combination of the one or more watermark modifications may be applied to the video frame before the video frame is received by the media device (or by the media device prior to being displayed to a user).

At block 1608, the media device detects a watermark in the first predetermined region of the video frame. The media device may detect the watermark may detecting the modulation of pixels in the first predetermined region. For example, the media device detects one or more pixels representing a first symbol and one or more pixels representing a second symbol (of a base-n code). In some instances, the media device may detect a lead-in pattern in the predetermined region. A lead-in pattern includes a predetermined sequence of pixels values that are indicative of a watermark. The watermark may be located after the lead-in pattern along the same row. When the media device detects the lead-in pattern, the media device identifies watermark.

At block 1612, the media device identifies, in the first predetermined region, one or more contiguous subsets of pixels that correspond to a first pixel value and one or more contiguous subsets of pixels that correspond to a second pixel value. A symbol may be represented by a contiguous subset of pixels (e.g., a predetermined quantity of adjacent pixels such as 1 row of 4 pixels, 2 rows of 4 pixels, etc.). The pixels of a contiguous subset may have a similar pixel value (e.g., similar hue, chroma, luminance, RGB value, combinations thereof, or the like) that may correspond to a first pixel value or a second pixel value. For example, if the first pixel value and the second pixel value correspond to luminance value, then the media device may identify each contiguous subset of pixels that have first luminance value (e.g., approximately 10-16) and each contiguous subset of pixels that have second luminance value (e.g., approximately 45-55).

The first value and the second value may be selected to reduce the likelihood that a user will perceive the watermark. A user may perceive the contrast between low luminance pixels next to high luminance pixels and detect the presence of the watermark as an artifact in the video frame. When modulating pixels using luminance, the difference between the first luminance value and the second luminance may be approximately 40.

While limiting the difference in luminance values may reduce the likelihood that a user may perceive the watermark (e.g., due to the contrasting luminance values next to each other be perceived as a flicker or artifact), it may also increase an error rate of the media device. To reduce the likelihood of errors, a video frame may increase the difference between the first pixel value (representing the first symbol) and the second pixel value (representing the second pixel). For example, every n video frames, a video frame may be received in which one or more contiguous subsets of pixels correspond to the first pixel value and one or more contiguous subsets of pixels correspond to a third pixel value. The first pixel value may continue to refer to a luminance value between 10-16. The third pixel value may refer to a luminance value of approximately 80. The difference between the third pixel value and the first pixel value may be approximately double the difference between the second pixel value and the first pixel value. In some instances, m frames may be received having a watermark with an increased difference between the first pixel value and the second pixel value. After m frames, the difference between the first pixel value and the second pixel may be returned (e.g., to approximately 40).

At block 1616, the media device assigns a first symbol to the one or more contiguous subsets of pixels that correspond to a first pixel value and second symbol the one or more contiguous subsets of pixels that correspond to a second pixel value. The first and second pixel values may represent a first symbol and a second symbol of a base-2 symbol set (e.g., binary code). Additional pixel values may be used to define base-n symbol sets. For example, modulating pixels based on luminance and chroma may produce a base-4 symbol set.

At block 1620, the media device generates a sequence of symbols based on the symbols assigned to the one or more contiguous subsets of pixels. The sequence of symbols may provide additional information associated with the video frame and/or cause the media device to perform certain functions. The additional information may include, but is not limited to, information associated with the content of the displayed video (e.g., such as actors, characters, settings, teams, production staff, production characteristics, or any other fact or characteristics of the content, metadata associated with displayed video (e.g., resolution, pixel values, broadcast origin, etc.), communications associated with the displayed video, etc. The functions can include, but are not limited, opening a web-browser to a particular URL, opening a pop-up window over the video frame, substituting a video segment stored locally or retrieved from a remote server.

The watermark in the next video frame may have a same sequence of symbols but may be inverted. In the next video frame, each contiguous subset of pixels that corresponded to the first pixel value in the previous frame may now correspond to the second pixel value and each contiguous subset of pixels that corresponded to the second pixel value in the previous frame may now correspond to the second first value. For example, as shown in FIG. 13A, frame 1 includes a first contiguous subset of pixels that correspond to a first pixel value (e.g., luminance of 10-16) followed by a second contiguous subset of pixels that correspond to a second pixel value (e.g., luminance of 40). The subsequent frame (e.g., frame 2), the first contiguous subset of pixels corresponds to a second pixel value and the second contiguous subset of pixels corresponds to the first pixel value. By inverting the pixel values in a subsequent frame, the pixels of the first predetermined region appear as the average of the first pixel value and the second pixel value (e.g., as a solid color). As a result, a user may not perceive the watermark.

Figure 17:
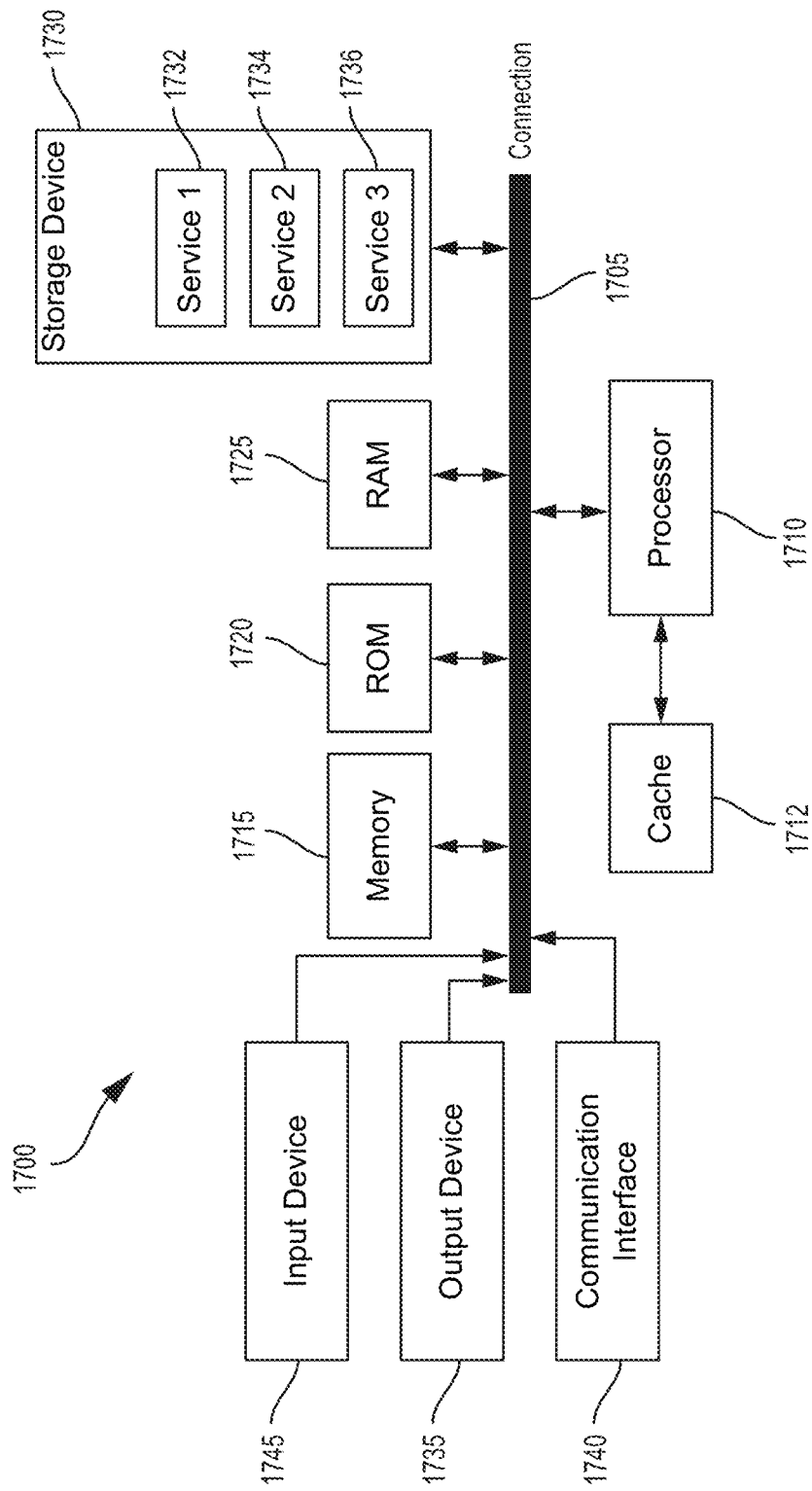
FIG. 17 illustrates an example computing device architecture of an example computing device that can implement the various techniques described herein according to aspects of the present disclosure.

FIG. 17 illustrates an example computing device according to aspects of the present disclosure. For example, the computing device 1700 can implement any of the systems or methods described herein. In some instances, the computing device 1700 may be a component of or included within a media device. The components of computing device 1700 are shown in electrical communication with each other using connection 1705, such as a bus. The example computing device architecture 1700 includes a processing unit (e.g., CPU, processor, or the like) 1710 and connection 1705 (e.g., such as a bus, or the like) that is configured to couple components of computing device 1700 such as, but not limited to, memory 1715, read only memory (ROM) 1720, random access memory (RAM) 1725, and/or storage device 1730, to processing unit 1710.

Computing device 1700 can include a cache 1712 of high-speed memory connected directly with, in close proximity to, or integrated within processing unit 1710. Computing device 1700 can copy data from memory 1715 and/or storage device 1730 to cache 1712 for quicker access by processing unit 1710. In this way, cache 1712 may provide a performance boost that avoids processor 1710 delays while waiting for data. Alternatively, processing unit 1701 may access the data directly from memory 1715 and/or storage device 1730. Memory 1715 can include multiple types of memory (e.g., such as magnetic, optical, solid-state, etc.).

Storage device 1730 may include one or more non-transitory computer-readable media such as volatile and/or non-volatile memories. A non-transitory computer-readable medium can store instructions and/or data accessible by a computing device 1700. Non-transitory computer-readable media can include, but is not limited to magnetic cassettes, hard-disk drives (HDD), flash memory, solid state memory devices, digital versatile disks, cartridges, compact discs, random access memories (RAMs) 1725, read only memory (ROM) 1720, combinations thereof, or the like.

Storage device 1730, which stores one or more services, such as service 1 1732, service 2 1734, and service 3 1736, that are executable by processing unit 1710 and/or other electronic hardware. The one or more services include instructions executable by the processing unit 1710 to perform operations such as any of the techniques described herein, controlling the operations of a device in communication with computing device 1700, controlling the operations of processing unit 1710 and/or any special-purpose processors, combinations therefor, or the like. Processing unit 1710 may be a system on a chip (SOC) that includes one or more cores or processors, a bus, memories, clock, memory controller, cache, other processor components, and/or the like. A multi-core processor may be symmetric or asymmetric.

Computing device 1700 may include one or more input devices 1745 that may represent any number of input mechanisms, such as a microphone, a touch-sensitive screen for graphical input, keyboard, mouse, motion input, speech, media devices, sensors, combinations thereof, or the like. Computing device 1700 may include one or more output devices 1735 that output data to a user. Such output devices 1735 may include, but is not limited to, a media device, projector, television, speakers, combinations thereof, or the like. In some instances, multimodal computing devices can enable a user to provide multiple types of input to communicate with computing device 1700. Communications interface 1740 may be configured to manage user input and computing device output. Communications interface 1740 may also be configured to managing communications with remote devices (e.g., establishing connection, receiving/transmitting communications, etc.) over one or more communication protocols and/or over one or more communication media (e.g., wired, wireless, etc.). Computing device 1700 is not limited to the components as shown. Other components may be added and components shown may be omitted.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored in a form that excludes carrier waves and/or electronic signals. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

While the present subject matter has been described in detail with respect to specific embodiments thereof, it will be appreciated that those skilled in the art, upon attaining an understanding of the foregoing, may readily produce alterations to, variations of, and equivalents to such embodiments. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

For clarity of explanation, in some instances the present disclosure may be presented as including individual functional blocks including functional blocks comprising devices, device components, steps or routines in a method embodied in software, or combinations of hardware and software. Additional functional blocks may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but may have additional steps not shown. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

Devices implementing the methods and systems described herein can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. The program code may be executed by a processor, which may include one or more processors, such as, but not limited to, one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A processor may be a microprocessor; conventional processor, controller, microcontroller, state machine, or the like. A processor may also be implemented as a combination of computing components (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein. Functionality described herein also can be embodied in peripherals or add-in cards. Such functionality can also be implemented on a circuit board among different chips or different processes executing in a single device, by way of further example.

In the foregoing description, aspects of the disclosure are described with reference to specific examples thereof, but those skilled in the art will recognize that the disclosure is not limited thereto. Thus, while illustrative examples of the disclosure have been described in detail herein, it is to be understood that the inventive concepts may be otherwise variously embodied and employed, and that the appended claims are intended to be construed to include such variations. Various features and aspects of the above-described disclosure may be used individually or in any combination. Further, examples can be utilized in any number of environments and applications beyond those described herein without departing from the broader spirit and scope of the disclosure. The disclosure and figures are, accordingly, to be regarded as illustrative rather than restrictive.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or media devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

What is claimed is:

1. A method comprising:
   receiving a video frame, wherein a first predetermined region of the video frame includes a first set of pixels and a second predetermined region of the video frame includes a second set of pixels, the second set of pixels having luminance and/or chrominance values that are selected based on luminance and/or chrominance values of pixels of a third predetermined region of the video frame to create a blending effect that reduces a perceptibility of a watermark encoded into the first set of pixels of the video frame;
   detecting a watermark in the first predetermined region of the video frame;
   identifying, within the first set of pixels, one or more contiguous subsets of pixels that correspond to a first pixel value and one or more contiguous subsets of pixels that correspond to a second pixel value;
   assigning a first symbol to the one or more contiguous subsets of pixels that correspond to a first pixel value and a second symbol to the one or more contiguous subsets of pixels that correspond to a second pixel value; and
   generating, based on the first pixel value and the second pixel value, a first sequence of symbols.

2. The method of claim 1, wherein the first predetermined region includes a first two rows of the video frame.

3. The method of claim 1, wherein the second predetermined region includes a third row of the video frame.

4. The method of claim 1, further comprising:
   receiving a subsequent video frame; and
   generating a second sequence of symbols from the subsequent video frame, wherein the second sequence of symbols is an inverted form of the first sequence of symbols.

5. The method of claim 1, further comprising:
   receiving a subsequent video frame, wherein the first predetermined region of the subsequent video frame includes a third set of pixels;
   identifying, within the third set of pixels, one or more contiguous subsets of pixels that correspond to a first pixel value and one or more contiguous subsets of pixels that correspond to a third pixel value, wherein a difference between the third pixel value and the first pixel value is approximately double a difference between the second pixel value and the first pixel value; and
   generating, from the third set of pixels, a second sequence of symbols.

6. The method of claim 1, wherein the first pixel value corresponds to a luminance value.

7. The method of claim 1, wherein detecting the watermark in the first predetermined region of the video frame includes:

detecting a lead-in pattern of pixels within the first predetermined region, the lead-in pattern of pixels being separate from the first sequence of symbols.

8. A system comprising:
one or more processors; and
a non-transitory computer-readable medium storing instructions that, when executed by the one or more processors, cause the one or more processors to perform operations including:
receiving a video frame, wherein a first predetermined region of the video frame includes a first set of pixels and a second predetermined region of the video frame includes a second set of pixels, the second set of pixels having luminance and/or chrominance values that are selected based on luminance and/or chrominance values of pixels of a third predetermined region of the video frame to create a blending effect that reduces a perceptibility of a watermark encoded into the first set of pixels of the video frame;
detecting a watermark in the first predetermined region of the video frame;
identifying, within the first set of pixels, one or more contiguous subsets of pixels that correspond to a first pixel value and one or more contiguous subsets of pixels that correspond to a second pixel value;
assigning a first symbol to the one or more contiguous subsets of pixels that correspond to a first pixel value and a second symbol to the one or more contiguous subsets of pixels that correspond to a second pixel value; and
generating, based on the first pixel value and the second pixel value, a first sequence of symbols.

9. The system of claim 8, wherein the first predetermined region includes a first two rows of the video frame.

10. The system of claim 8, wherein the second predetermined region includes a third row of the video frame.

11. The system of claim 8, wherein the operations further include:
receiving a subsequent video frame; and
generating a second sequence of symbols from the subsequent video frame, wherein the second sequence of symbols is an inverted form of the first sequence of symbols.

12. The system of claim 8, wherein the operations further include:
receiving a subsequent video frame, wherein the first predetermined region of the subsequent video frame includes a third set of pixels;
identifying, within the third set of pixels, one or more contiguous subsets of pixels that correspond to a first pixel value and one or more contiguous subsets of pixels that correspond to a third pixel value, wherein a difference between the third pixel value and the first pixel value is approximately double a difference between the second pixel value and the first pixel value; and
generating, from the third set of pixels, a second sequence of symbols.

13. The system of claim 8, wherein the first pixel value corresponds to a luminance value.

14. The system of claim 8, wherein detecting the watermark in the first predetermined region of the video frame includes:

detecting a lead-in pattern of pixels within the first predetermined region, the lead-in pattern of pixels being separated from the first sequence of symbols.

15. A non-transitory computer-readable medium storing instructions that, when executed by one or more processors, cause the one or more processors to perform operations including:
receiving a video frame, wherein a first predetermined region of the video frame includes a first set of pixels and a second predetermined region of the video frame includes a second set of pixels, the second set of pixels having luminance and/or chrominance values that are selected based on luminance and/or chrominance values of pixels of a third predetermined region of the video frame to create a blending effect that reduces a perceptibility of a watermark encoded into the first set of pixels of the video frame;
detecting a watermark in the first predetermined region of the video frame;
identifying, within the first set of pixels, one or more contiguous subsets of pixels that correspond to a first pixel value and one or more contiguous subsets of pixels that correspond to a second pixel value;
assigning a first symbol to the one or more contiguous subsets of pixels that correspond to a first pixel value and a second symbol to the one or more contiguous subsets of pixels that correspond to a second pixel value; and
generating, based on the first pixel value and the second pixel value, a first sequence of symbols.

16. The non-transitory computer-readable medium of claim 15, wherein the first predetermined region includes a first two rows of the video frame.

17. The non-transitory computer-readable medium of claim 15, wherein the second predetermined region includes a third row of the video frame.

18. The non-transitory computer-readable medium of claim 15, wherein the operations further include:
receiving a subsequent video frame; and
generating a second sequence of symbols from the subsequent video frame, wherein the second sequence of symbols is an inverted form of the first sequence of symbols.

19. The non-transitory computer-readable medium of claim 15, wherein the operations further include:
receiving a subsequent video frame, wherein the first predetermined region of the subsequent video frame includes a third set of pixels;
identifying, within the third set of pixels, one or more contiguous subsets of pixels that correspond to a first pixel value and one or more contiguous subsets of pixels that correspond to a third pixel value, wherein a difference between the third pixel value and the first pixel value is approximately double a difference between the second pixel value and the first pixel value; and
generating, from the third set of pixels, a second sequence of symbols.

20. The non-transitory computer-readable medium of claim 15, wherein detecting the watermark in the first predetermined region of the video frame includes:
detecting a lead-in pattern of pixels within the first predetermined region, the lead-in pattern of pixels being separate from the first sequence of symbols.

* * * * *